(12) United States Patent
Moon

(10) Patent No.: US 11,985,570 B2
(45) Date of Patent: May 14, 2024

(54) POSITION MEASUREMENT SYSTEM FOR MOBILE TERMINAL

(71) Applicants: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

(72) Inventor: Hi Chan Moon, Seoul (KR)

(73) Assignees: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

( * ) Notice: Subject to any disclaimer, the term of this patent is extended or adjusted under 35 U.S.C. 154(b) by 0 days.

(21) Appl. No.: 17/941,085

(22) Filed: Sep. 9, 2022

(65) Prior Publication Data

US 2023/0007443 A1  Jan. 5, 2023

Related U.S. Application Data

(63) Continuation of application No. 17/048,820, filed as application No. PCT/KR2019/004752 on Apr. 19, 2019, now Pat. No. 11,445,331.

(30) Foreign Application Priority Data

Apr. 20, 2018  (KR) .................... 10-2018-0046139
Apr. 27, 2018  (KR) .................... 10-2018-0048825
(Continued)

(51) Int. Cl.
*H04W 4/029* (2018.01)
*G01S 5/02* (2010.01)
(Continued)

(52) U.S. Cl.
CPC ............... *H04W 4/029* (2018.02); *G01S 5/02* (2013.01); *H04W 24/10* (2013.01);
(Continued)

(58) Field of Classification Search
CPC ... H04W 4/029; H04W 24/10; H04W 64/003; H04W 72/21; H04W 72/23; H04W 4/02;
(Continued)

(56) References Cited

U.S. PATENT DOCUMENTS 8,942,720 B2     1/2015  Siomina et al.
2012/0275364 A1  11/2012 Anderson et al.
(Continued)

FOREIGN PATENT DOCUMENTS

CN    1276956 A    12/2000
CN    105493585 A   4/2016
(Continued)

OTHER PUBLICATIONS

International Search Report of PCT/KR2019/004752 dated Aug. 5, 2019 [PCT/ISA/210].
(Continued)

*Primary Examiner* — Hirdepal Singh
(74) *Attorney, Agent, or Firm* — Sughrue Mion, PLLC

(57) ABSTRACT

Disclosed is a positioning device, a position measurement server, and a position measurement system capable of estimating a relatively accurate position on the basis of a signal transmitted from a terminal in a mobile communication system. Particularly, the positioning device acquires channel configuration information of an uplink signal of a target terminal, receives the uplink signal of the target terminal through one or more uplink signal reception units on the basis of the channel configuration information, measures information on the received uplink signal, and transmits the information on the uplink signal of the target terminal to the
(Continued)

position measurement server, and the position measurement server receives the information on the uplink signal of the target terminal from the positioning device and calculates a position of the target terminal on the basis of the information on the uplink signal of the target terminal.

17 Claims, 14 Drawing Sheets

(30) Foreign Application Priority Data

Aug. 28, 2018 (KR) .................. 10-2018-0101066
Apr. 18, 2019 (KR) .................. 10-2019-0045762

(51) Int. Cl.
  *H04W 24/10* (2009.01)
  *H04W 64/00* (2009.01)
  *H04W 72/21* (2023.01)
  *H04W 72/23* (2023.01)

(52) U.S. Cl.
  CPC ......... *H04W 64/003* (2013.01); *H04W 72/21* (2023.01); *H04W 72/23* (2023.01)

(58) Field of Classification Search
  CPC ... H04W 56/0015; H04W 64/00; H04W 4/12; G01S 5/02; G01S 5/02216; G01S 5/02213; G01S 5/0236; G01S 5/0205; G01S 2205/006
  USPC .................................................. 455/456.1
  See application file for complete search history.

(56) References Cited

U.S. PATENT DOCUMENTS

| 2014/0029586 A1 | 1/2014 | Loehr et al. |
| 2015/0219750 A1 | 8/2015 | Xiao et al. |
| 2015/0304909 A1 | 10/2015 | Yoshimoto et al. |
| 2017/0288897 A1* | 10/2017 | You .................. G01S 5/0252 |
| 2019/0297583 A1* | 9/2019 | Lin .................. H04W 52/04 |
| 2019/0324111 A1* | 10/2019 | Marshall ............. G01S 5/145 |
| 2022/0141795 A1* | 5/2022 | Ku .................. H04W 64/006 455/456.6 |

FOREIGN PATENT DOCUMENTS

| CN | 106793065 A | 5/2017 |
| EP | 3866520 A1 | 8/2021 |
| JP | 10-253736 A | 9/1998 |
| JP | P2001-359143 A | 12/2001 |
| JP | 2004-364167 A | 12/2004 |
| JP | 2006-53775 A | 2/2006 |
| JP | 2012-523761 A | 10/2012 |
| JP | 2014-239403 A | 12/2014 |
| JP | 2016-500214 A | 1/2016 |
| KR | 10-2010-0028475 A | 3/2010 |
| KR | 10-2012-0055118 A | 5/2012 |
| KR | 10-1493314 B1 | 2/2015 |
| KR | 10-1779767 B1 | 9/2017 |
| KR | 101779767 B1 * | 9/2017 |
| WO | 99/09778 A1 | 2/1999 |
| WO | 2010/118104 A1 | 10/2010 |
| WO | 2014/053998 A1 | 4/2014 |
| WO | 2015/180119 A1 | 12/2015 |
| WO | 2016/032200 A2 | 3/2016 |
| WO | 2017/061666 A1 | 4/2017 |
| WO | 2018/067380 A1 | 4/2018 |

OTHER PUBLICATIONS

Nokia, Alcatel-Lucent Shanghai Bell, "UTDOA Positioning in NB-Iot", 3GPP TSG RAN WG1 Meeting #87, Reno, USA, Nov. 14-18, 2016, R1-1611305, 4 pages total.
Notice of Allowance issued in parent U.S. Appl. No. 17/048,820 dated May 10, 2022.
Office Action issued in parent U.S. Appl. No. 17/048,820 dated Oct. 6, 2021.
Final Office Action issued on Oct. 24, 2023 for counterpart Japanese Patent Application No. 2022-121011.

* cited by examiner

POSITION MEASUREMENT SYSTEM FOR MOBILE TERMINAL

This application is a continuation of U.S. application Ser. No. 17/048,820 filed on Oct. 19, 2020, which is a National Stage of International Application No. PCT/KR2019/004752 filed Apr. 19, 2019, claiming priority based on Korean Patent Application No. 10-2018-0046139 filed Apr. 20, 2018, Korean Patent Application No. 10-2018-0048825 filed Apr. 27, 2018, Korean Patent Application No. 10-2018-0101066 filed Aug. 28, 2018 and Korean Patent Application No. 10-2019-0045762 filed Apr. 18, 2019, in the Korean Intellectual Property Office, the entire contents of which are hereby incorporated by reference.

TECHNICAL FIELD

The present disclosure relates to a system for estimating a position of a mobile terminal in a mobile communication system, and more specifically, to a device, a server, a system and a network for estimating a position of a mobile terminal in a system or network for mobile communication.

BACKGROUND ART

FIG. 1 shows a wireless connection between a terminal and a base station in a mobile communication system. Referring to FIG. 1, the mobile communication system is made up of the terminal and the base station. A position of a terminal is typically estimated based on a signal transmitted from the terminal. A typical method of estimating a position of a terminal is to use a delay value taken for a signal transmitted by the terminal to reach a base station. Further, a distance between a terminal and a base station may be estimated based on an amount of propagation attenuation occurring on a channel on which a signal transmitted by the terminal reaches the base station.

In other words, in the typical mobile communication system, a position of a terminal is estimated based on delay or propagation attenuation on a wireless channel of a signal that is transmitted by the terminal and then received by a base station, or the like.

However, a drawback of such a method is that it is not easy to estimate a position of a terminal accurately due to a long distance between base stations. In mobile communication systems, a distance between base stations is usually around 1-3 km in urban and suburban areas, and around 10 km or more in rural or mountainous areas.

In most situations, a limitation of such a typical method of estimating a terminal position is that the number of base stations for detecting a signal transmitted by the terminal is not large. In a situation where a terminal is present in a handover-enabled area, a position of the terminal can be measured more accurately based on signals received by two or more base stations; however, this scenario is available to only some limited terminals.

Further, in a situation where an obstacle such as a building is present between a terminal and a base station, propagation delay and attenuation in such a situation may be much greater than those in a situation where such an obstacle is not present; thus, the accuracy of estimating a position of the terminal may be lowered.

Due to these problems, in most cases, the accuracy of estimating a position of a terminal using such a typical method is around several hundred meters.

DETAILED DESCRIPTION OF THE INVENTION

Technical Problem

In accordance with embodiments of the present disclosure, a position measurement system is provided that is capable of estimating a position of a terminal more accurately based on a signal transmitted from the terminal in a mobile communication system.

Technical Solution

To address the above issues, in accordance with one aspect of the present disclosure, a position measurement system is provided that includes a positioning device obtaining channel configuration information for an uplink signal of a target terminal from a base station in a mobile communication network, receiving an uplink signal of the target terminal via one or more uplink signal receivers based on the channel configuration information, measuring information on the received uplink signal, and transmitting the information on the uplink signal of the target terminal to a position measurement server, and the position measurement server receiving the information on the uplink signal of the target terminal from the positioning device, and calculating a position of the target terminal based on the information on the uplink signal of the target terminal.

In accordance with another aspect of the present disclosure, a positioning device is provided that includes one or more downlink signal receivers receiving a downlink signal from a base station in a mobile communication network, a controller obtaining channel configuration information for an uplink signal of a target terminal, one or more uplink signal receivers receiving the uplink signal of the target terminal based on the channel configuration information and measuring information on the uplink signal, and a transmitter transmitting the information on the uplink signal to a position measurement server.

In accordance with further another aspect of the present disclosure, a mobile communication network is provided that establishes a call connection with a target terminal, and provides a positioning device with identification information of the target terminal.

In accordance with yet another aspect of the present disclosure, a position measurement system is provided that includes a positioning device receiving resource assignment information, and parameters related to an uplink transmission, of a target terminal from a mobile communication network, receiving an uplink signal of the target terminal via one or more uplink signal receivers based on the resource assignment information and the transmission parameters, measuring information on the received uplink signal, and transmitting the information on the uplink signal of the target terminal to a position measurement server, and a position measurement server receiving the information on the uplink signal of the target terminal from the positioning device, and calculating a position of the target terminal based on the information on the uplink signal of the target terminal.

In accordance with yet another aspect of the present disclosure, a positioning device is provided that includes a communication unit receiving resource assignment information and uplink transmission parameter information of a target terminal from a mobile communication network, and one or more uplink signal receivers receiving an uplink signal of the target terminal based on the resource assignment information and uplink transmission parameter information, and measuring information on the received uplink signal, and the communication unit transmitting identification information of the target terminal and the information on the uplink signal of the target terminal to a position measurement server.

In accordance with yet another aspect of the present disclosure, a mobile communication network is provided that establishes a call connection with a target terminal, and provides a positioning device with resource assignment information and uplink transmission parameter information of the target terminal.

In accordance with yet another aspect of the present disclosure, a position measurement server is provided that includes a receiver receiving information on an uplink signal of a target terminal from a positioning device, and a controller calculating a position of the target terminal based on the information on the uplink signal of the target terminal.

Effects of the Invention

In the position measurement system according to embodiments of the present disclosure, one or more positioning devices obtain information on resource assignment related to an uplink transmission of a target terminal, a transmission time, and the like, and measure an uplink signal of the target terminal based on the obtained information. In accordance with embodiments of the present disclosure, it is possible to measure accurately a position of a target terminal based on information on a reception time, reception power, a reception direction, and the like, for an uplink signal transmission of the target terminal using one or more positioning devices. Accordingly, it is possible to identify a position of a missing person or a person in distress more precisely and respond to such a situation quickly.

BEST MODE FOR CARRYING OUT THE INVENTION

Figure 1:
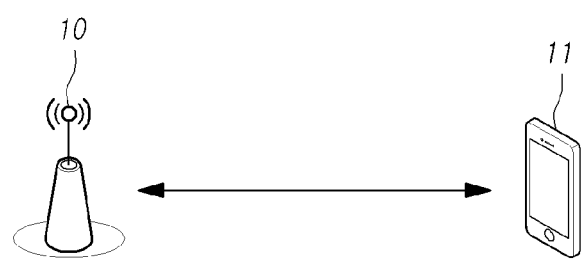
FIG. 1 illustrates a typical position measurement based on a base station.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, detailed discussions on known functions and configurations incorporated herein may be omitted when it is needed to focus on the subject matter of the present disclosure.

In the present disclosure, a wireless communication system denotes a system for providing various communication services such as a voice communication service, a packet data service, etc. The wireless communication system includes a terminal (includes a user device or a user equipment (UE)) and a base station (BS).

The terminal is a generic term referring to devices used in wireless communication. For example, the terminal may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally denote a station communicating with the terminal. The base station or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of these various cells is controlled by a base station. Therefore, the base station may be classified into two types. 1) One type of the base station may denote an apparatus providing a megacell, a macrocell, a microcell, a picocell, a femtocell, or a small cell that forms a communication service area, and 2) the other type of the base station may denote the communication service area. Apparatuses that form and provide any corresponding communication service area and are controlled by an identical entity, or apparatuses that interact and cooperate with each other for forming and providing the corresponding communication service area may be denoted as a base station of the type 1). According to a scheme of forming and providing a communication service area, a point, a transmission/reception point, a transmission point, a reception point, or the like is an example of this type of base station. A communication service area itself to which a terminal or a neighboring base station transmits a signal or from which the terminal or the neighboring base station receives a signal may be denoted as a base station of the type 2).

In the present disclosure, the cell may denote a coverage of a signal transmitted from a transmission/reception point, a component carrier having a coverage of a signal transmitted from a transmission point or a transmission/reception point, or a transmission/reception point itself.

The terminal and the base station herein are entities for performing two types of transmissions or receptions (uplink and downlink) used to embody embodiments, examples, technologies, or technical ideas described in the present disclosure. Thus, the terminal and the base station herein include all entities capable of performing such operations and are not limited to specific terms or words.

Herein, the uplink (UL or a reverse direction) denotes a scheme of data transmission/reception by a UE to/from a base station, and the downlink (DL, or a forward direction) denotes a scheme of data transmission/reception by a base station to/from a UE.

An uplink transmission and a downlink transmission may be performed using a time division duplex (TDD) technique in which a transmission can be performed at a time different from another transmission, a frequency division duplex (FDD) technique in which a transmission can be performed at a frequency different from another transmission, or a hybrid technique of the frequency division duplex (FDD) and the time division duplex (TDD).

The downlink herein may denote a downlink transmitted over a frequency band for transmitting resource assignment information and control information for an uplink transmission.

Further, in a standard for a wireless communication system, uplink and downlink are configured based on a single carrier or a pair of carriers.

Control information is transmitted in the uplink and/or the downlink configured with a control channel, such as a physical downlink control channel (PDCCH), a physical uplink control channel (PUCCH), and the like, and Data are transmitted in the uplink and/or the downlink configured with a data channel, such as a physical downlink shared channel (PDSCH), a physical uplink shared channel (PUSCH), and the like.

The downlink may denote communication or a communication path from multiple transmission/reception points to a terminal, and the uplink may denote communication or a communication path from the terminal to the multiple transmission/reception points. In the downlink, a transmitter may be a part of the multiple transmission/reception points, and a receiver may be a part of the terminal. In the uplink, a transmitter may be a part of the terminal and a receiver may be a part of the multiple transmission/reception points.

Hereinafter, a situation where a signal is transmitted or received through a channel such as the PUCCH, the PUSCH, the PDCCH, or the PDSCH, may be expressed as the transmission or reception of the PUCCH, the PUSCH, the PDCCH, or the PDSCH.

Meanwhile, higher layer signaling herein includes radio resource control (RRC) signaling transmitting RRC information containing an RRC parameter.

A base station performs a downlink transmission to terminals. The base station may transmit a physical downlink control channel for transmitting i) downlink control information, such as scheduling required to receive a downlink data channel that is a primary physical channel for a unicast transmission, and ii) scheduling approval information for a transmission through an uplink data channel. Hereinafter, transmitting/receiving a signal through each channel may be described in such a manner that a corresponding channel is transmitted/received. A base station may transmit channel configuration information, such as resource assignment information to a terminal through a PDCCH, Further, the base station may transmit a control signal for resource assignment and signal transmission to the terminal through a PDSCH as well. Further, the base station may transmit the control signal for the resource assignment and the signal transmission to the terminal using a downlink control channel or data channel.

Any of multiple access techniques applied to wireless communication systems may be applicable to a wireless communication system of the present disclosure. For example, the wireless communication system may employ various multiple access techniques, such as time division multiple access (TDMA), frequency division multiple access (FDMA), code division multiple access (CDMA), orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low density spreading (LDS), and the like.

Embodiments or examples described in the present disclosure may be applicable to resource assignment in both an asynchronous wireless communication evolving into LTE/LTE-advanced and IMT-2020 from GSM, WCDMA, and HSPA, and a synchronous wireless communication evolving into code division multiple access, CDMA-2000, and UMB.

In the present disclosure, a machine type communication (MTC) terminal may denote a terminal supporting low costs (or low complexity), a terminal supporting coverage enhancement, or the like. As another example, the MTC terminal may denote a terminal defined as a predetermined category for supporting low costs (or low complexity) and/or coverage enhancement.

In other words, the MTC terminal herein may denote a low cost (or low complexity) user equipment category/type newly defined in 3GPP Release-13 and performing LTE-based MTC-related operations. The MTC terminal may denote a user equipment category/type defined in or before 3GPP Release-12, which supports enhanced coverage in comparison with the typical LTE coverage or supports low power consumption. The MTC terminal may also denote a low cost (or low complexity) user equipment category/type newly defined in Release-13. The MTC terminal may denote a further enhanced MTC terminal defined in Release-14.

In the present disclosure, a NarrowBand Internet of Things (NB-IoT) terminal denotes a terminal supporting radio access for cellular IoT. NB-IoT technology has been developed to provide improved indoor coverage, support for large-scale low-speed terminals, low latency sensitivity, very low terminal costs, low power consumption, and optimized network architecture.

An enhanced mobile broadband (eMBB), massive machine-type communication (mMTC), and ultra-reliable and low latency communication (URLLC) are proposed as representative usage scenarios for new radio (NR) having been discussed in the 3GPP recently.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

Hereinafter, embodiments, examples, and technical ideas of the present disclosure will be described based on two nodes, i.e. a terminal and a base station. However, this is merely for convenience of description and ease of understanding, and an identical technical idea or principle can be applied between terminals. For example, a base station described below may represent and discuss, as an example, one of possible nodes performing communication with a terminal, and when needed, be replaced with another terminal communicating with the terminal, an infrastructure apparatus, or the like.

That is, embodiments, examples, or technical ideas or principles of the present disclosure may be applicable to, as well as communication between a terminal and a base station, device-to-device (D2D) communication, sidelink communication, vehicle communication (V2X), or the like. In particular, embodiments, examples, or technical ideas or principles of the present disclosure may be applicable to device-to-device communication employing the next generation radio access technology, and the terms of a signal, a channel etc. described herein may be used by being variously changed according to types of device-to-device communication.

For example, the PSS and the SSS may be applied in device-to-device communication by being changed to a primary D2D synchronization signal (PSSS) and a secondary D2D synchronization signal (SSSS), respectively. Further, a channel carrying broadcast information, such as the PBCH, may be changed to a PSBCH to be applied to embodiments or examples of the present disclosure. A channel transferring data in sidelink, such as the PUSCH and the PDSCH, may be changed to a PSSCH to be applied to embodiments or examples of the present disclosure. A channel transferring control information, such as the PDCCH and the PUCCH, may be changed to a PSCCH to be applied to embodiments or examples of the present disclosure. Meanwhile, a discovery signal is needed in the device-to-device communication, and transmitted and/or received over a PSDCH. Embodiments of the present disclosure is not limited to such terms.

Hereinafter, embodiments, examples, or technical ideas or principles of the present disclosure will be described, for example, based on communication between a terminal and a base station; however, may be applicable to communication between the terminal and another terminal replacing the base station node.

The present disclosure relates to methods and apparatuses for obtaining information on a position of a terminal in a wireless communication system, particularly a mobile communication system.

In the present disclosure, a positioning device is provided that is equipped with both a downlink signal receiver and an uplink signal receiver in the mobile communication system. Herein, the positioning device denotes a device capable of finding or measuring a position of a terminal, locating the terminal, or measuring/obtaining/calculating information or data related to the terminal (hereinafter, described as "positioning device"). The proposed positioning device may include multiple uplink signal receivers, and the multiple uplink signal receivers may be arranged in different physical positions from one another.

The positioning device may obtain information on which signal is transmitted from a terminal to a base station through uplink by analyzing a downlink signal transmitted from the base station. Further, the positioning device may receive an uplink signal through the uplink signal receiver, determine whether corresponding uplink data are transmitted from the terminal to the base station, and then identify a position of the terminal based on the received signal or data.

Further, the positioning device receives resource assignment information and uplink transmission parameter information of a target terminal from the mobile communication system. The positioning device may receive an uplink signal through the uplink signal receiver, and then identify a position of the terminal based on the received uplink signal.

Embodiments or examples of the present disclosure are related to a technology for obtaining position information of terminals in the wireless communication system.

Devices, products, or methods to which embodiments, examples or technical ideas of the present disclosure are applied are related to locating a missing person or a person in distress, and estimating the position for lifesaving in case of disaster or distress through mobile communication systems.

A related technology that is closely associated with the embodiments or examples of the present disclosure is mobile communication systems.

Hereinafter, embodiments of the present disclosure will be discussed in detail with reference to accompanying drawings. Further, in describing embodiments of the present disclosure, detailed discussions on known functions and configurations incorporated herein may be omitted when it is needed to focus on the subject matter of the present disclosure. The terms described below are terms defined considering embodiments, examples, and technical ideas in the present disclosure, and may be differently expressed according to intentions or customs of a user, an operator, or the like. Thus, such definition should be interpreted based on the context of the present disclosure.

Meanwhile, each of embodiments or examples described below may be applicable individually or in any combination with one or more other embodiments or examples.

Each of a base station and a terminal can transmit a signal to, and receive a signal from, each other in mobile communication systems of the present disclosure. In accordance with embodiments of the present disclosure, a position measurement system is provided that includes a positioning device placed around a target terminal required to be located, and receiving an uplink signal from the target terminal and transmitting information on the uplink signal to a position measurement server, and position measurement server measuring a position of the target terminal.

The positioning device according to embodiments of the present disclosure captures an uplink signal transmitted by the target terminal, and the position measurement server measures a position of the target terminal based on this. In order to measure accurately a position of the target terminal, one or more positioning devices may be placed around the target terminal. The positioning device of the present disclosure may be used while being carried by a user, or may also be used while being installed in a vehicle or a drone. For convenience of description, it is assumed that mobile communication systems in the present disclosure are LTE-based mobile communication systems. However, embodiments of the present disclosure are not limited thereto. For example, embodiments of the present disclosure may be applied to other mobile communication systems commonly or mutatis mutandis to which other communication technologies are applied. In particular, using embodiments of the present disclosure, it is also possible to accurately measure a position of a terminal in GSM and W-CDMA communication systems, which are circuit-based mobile communication systems, of mobile communication systems. Further, embodiments of the present disclosure are also applicable to various wireless communication systems including other mobile communication systems.

A device employed in the present disclosure is movable. While a device for position measurement according to a typical scheme is present at a fixed position, the device employed in the present disclosure has advantages of being carried and being movable. When such a device according to embodiments of the present disclosure is movable, a user or object carrying the device can move to a position more adjacent to a target terminal required to be located. That is, since the device can get closer to the target terminal, the position of the target terminal can be more accurately measured. In another embodiment, the device according to embodiments of the present disclosure can also be installed in a fixed position; thus, it can be used for accurately measuring a position of a terminal.

Figure 2:
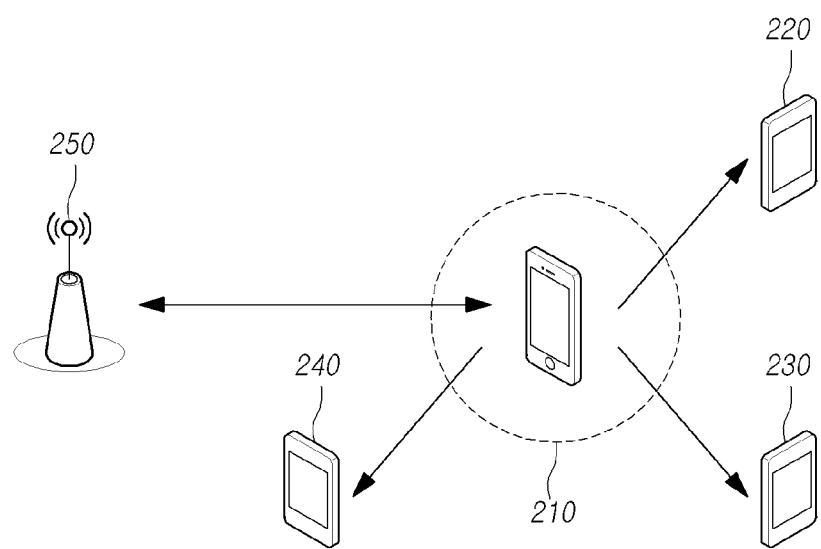
FIG. 2 illustrates a conception of a position measurement according to an embodiment of the present disclosure.

FIG. 2 illustrates a conception of a position measurement according to an embodiment of the present disclosure. Referring to FIG. 2, each of a base station 250 and a terminal 210 transmits a signal to, and receives a signal from, each other in mobile communication systems.

One or more positioning devices 220, 230 and 240 of the present disclosure are placed around a terminal (target terminal) 210 required to be located, and receive a signal transmitted by the target terminal 210, and based on this, a position measurement server measures the position of the target terminal 210.

At this time, the position of the target terminal can be measured based on delays of the signal taken for the signal transmitted by the target terminal 210 to reach the positioning devices 220, 230 and 240, and strengths of the signal received by the respective devices 220, 230 and 240.

Further, one or more positioning devices 220, 230 and 240 can measure a position of the target terminal using an angle at which a signal is received or a direction in which the signal is received. For example, one or more positioning devices each may include one or more uplink signal receivers, and measure a position of a target terminal by combining one or more of a reception angle or a reception direction of an uplink signal received via an antenna connected to each uplink signal receiver, a reception time, and reception power. In another example, one or more positioning devices each may include one or more uplink signal receivers, and transmit, to a position measurement server, information on an angle at which an uplink signal is received via an antenna connected to each uplink signal receiver or information on a direction in which the uplink signal is received via the antenna connected to each uplink signal receiver, reception time information, and reception power information, and then the position measurement server may measure a position of a target terminal by combining one or more of the reception angle or reception direction information of the received signal, the reception time information, and the reception power information. In order to locate a target terminal more accurately, a larger number of positioning devices may be placed around the target terminal 210. Further, information or data required to measure a position of the target terminal are not limited to measurements from the positioning device. For example, a position of the target terminal may be measured more accurately by combining information on a strength and a time delay of a signal received by the base station 250 and information received by the positioning device.

To perform such a measurement, it is necessary for a link to be established between a base station and a target terminal, and then the target terminal is required to transmit an uplink signal. Further, even when a link between the target terminal and the base station has been already established, for more accurate measurement, the target terminal may be configured to transmit a signal defined in advance between an associated mobile communication network and a corresponding positioning device. In the present disclosure, establishing a link between a base station and a target terminal in this manner, and allowing the base station to configure the target terminal to transmit such a signal defined in advance may be defined as a link establishment for measurement.

A request for a link establishment between the base station and the target terminal may be also performed by allowing a positioning device of the present disclosure to perform the request directly to the mobile communication system. In another embodiment, a searcher may transmit the request to a position measurement server according to embodiments of the present disclosure, and then the position measurement server may transfer the request to an associated mobile communication network. Thereafter, information on a link received from the mobile communication network may be provided to one or more positioning devices.

In this process, one of the positioning devices adjacent to the target terminal may become a master, and a request for setting for establishing a link, termination of the link, or the like may be transmitted by the master positioning device. Further, in another embodiment, all of the positioning devices may be allowed to have an equal authority and perform a request for setting, termination, or the like for the link establishment.

The positioning devices 220, 230 and 240 according to embodiments of the present disclosure receive an uplink signal transmitted by the target terminal 210 in the mobile communication system and perform a position measurement of the target terminal 210 based on information on strengths and time delays of the signal. In order to obtain a time point at which the target terminal 210 transmits a signal in the mobile communication system, the positioning devices 220, 230 and 240 of the present disclosure include one or more downlink signal receivers for receiving a signal transmitted by the base station 250. That is, the positioning devices 220, 230 and 240 of the present disclosure can detect a forward direction (downlink) signal transmitted from the mobile communication system via the respective downlink signal receivers, and based on detected information, estimate a time point at which a reverse direction (uplink) signal is transmitted. That is, the positioning devices 220, 230 and 240 can obtain a reference time point at which the signal of the reverse direction link is transmitted, and detect and receive a reverse direction signal transmitted by the target terminal 210 around this reference time point. In this embodiment, a frequency band on which control information or channel configuration information, specifically resource assignment information, is transmitted to the target terminal may be configured to be received through the downlink signal received by at least one of the positioning devices 220, 230 and 240. Further, the downlink signal receiver of the positioning device receives a signal of a base station having a call establishment with the target terminal. When needed, the downlink signal receiver included in the positioning device may receive system information transmitted by the base station, for example, information on a broadcasting control channel (BCCH), a BCH, or the like, and then obtain overall parameters, or the like for the associated system.

Figure 3:
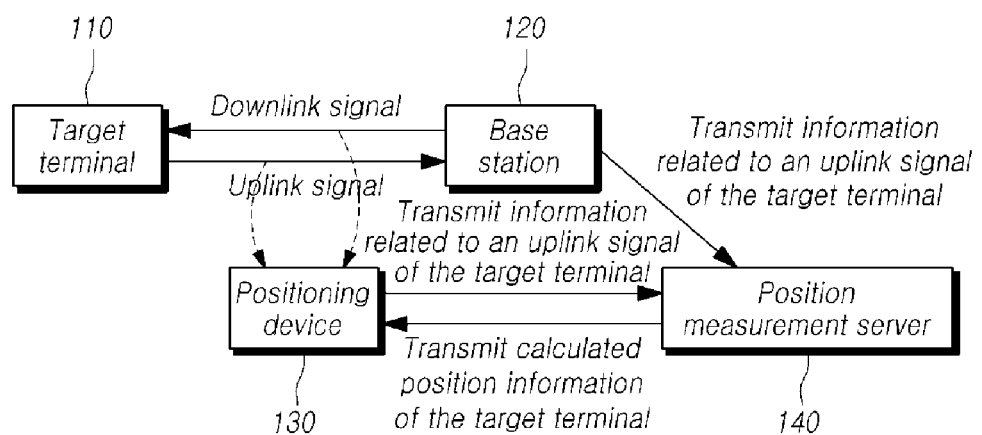
FIG. 3 illustrates communication between entities included in a position measurement system according to an embodiment of the present disclosure.

FIG. 3 illustrates communication between entities included in a position measurement system according to an embodiment of the present disclosure.

Herein, it is assumed that a base station 120 and a target terminal 110 transmit/receive wireless signals to/from each other in a typical mobile communication system 120. Herein, the wireless signal may be a signal used in mobile communication systems. Hereinafter, discussions on embodiments of the present disclosure are conducted based on an LTE mobile communication system of the mobile communication systems for convenience of description. However, embodiments of the present disclosure are not limited the LTE mobile communication system.

The position measurement system in FIG. 3 includes a positioning device 130 and a position measurement server 140 for measuring a position of the target terminal 110. One or more positioning devices 130 may be needed to perform embodiments of the present disclosure. The positioning device 130 of the present disclosure may receive an uplink signal or a downlink signal transmitted between the target terminal 110 and the base station 120 via an uplink signal receiver and a downlink signal receiver. The uplink signal receiver and the downlink signal receiver of the positioning device 130 are not signal receivers included in either the target terminal 110 transmitting an uplink signal or the base station 120 transmitting a downlink signal, and are capable of receiving an uplink signal or a downlink signal transmitted from one or more other communication devices. One of such other communication devices may be the target terminal. When an uplink signal is received, the positioning device 130 measures a reception time and a propagation strength of the uplink signal from the target terminal 110, or the like. Further, the positioning device 130 can measure a direction in which the signal is received, an angle at which the signal is received, or the like. The positioning device 130 measures the signal transmitted by the target terminal 110 and transmits the resulted measurement to the position measurement server 140. The position measurement server 140 determines a position of the target terminal 110 based on this, and then transmits information on the determined position to the positioning device 130. The positioning device 130 receiving the position information provides a user with the position of the target terminal 110 via an output unit or device, such as a display, or the like.

To do this, the positioning device 130 receives identification information of the target terminal 110 from the base station 120 via a communication unit. The communication unit is a configuration, component or unit capable of transmitting/receiving a signal to/from one or more other communication devices/apparatuses/systems, such as the base station 120, the position measurement server 140, or the like. In this embodiment, the communication unit may be configured to be separated from the uplink signal receiver or the downlink signal receiver. In another embodiment, a receiving portion of the communication unit may be the downlink signal receiver itself or configured in the downlink signal receiver, to receive a signal from the base station 120 or the position measurement server 140. For example, a frequency band used by a downlink signal transmitted to the target terminal and a downlink frequency band used by the communication unit of the positioning device may be the same frequency band, and therefore, corresponding signals may be received via one downlink receiver.

In one embodiment, the positioning device 130 of the present disclosure may receive a radio network temporary identifier (RNTI) corresponding to a temporary identifier (ID) assigned by a base station 120 to a terminal as identification information as the target terminal 110.

The RNTI is used as a temporary ID of a terminal in a base station, and since an RNTI that will be assigned to a terminal is not indicated in advance or not shared, anonymity can be maintained. Herein, the RNTI is employed for the purpose of identifying a terminal; however, embodiments of the present disclosure are not limited thereto. Herein, it should be noted that any ID temporarily assigned to a terminal in one base station or cell may be used for the same purpose or function as the RNTI.

In one embodiment, when a report on a missing person (or a person in distress) is received, the base station 120 of an associated mobile communication network assigns one RNTI to the missing person, and provides the RNTI information to at least one positioning device 130. The positioning device 130 which received the RNTI information detects an uplink signal from a terminal 110 transmitting the uplink signal using the corresponding RNTI, and then estimates a position of the terminal 110 based on the detected signal. To do this, the base station may directly transmit the RNTI information to the positioning device, or in another embodiment, the base station may transmit the RNTI information to a communication server using a target terminal information server, and then the communication server may transmit the RNTI information to the positioning device. In another embodiment, an RNTI to be used for measurement may be defined in advance between a base station of a mobile communication network and a positioning device. In this embodiment, the base station may assign the predefined RNTI to a target terminal, and the positioning device may detect and measure a signal from the target terminal using the RNTI. Further, multiple RNTIs may be defined in advance between a mobile communication network and a positioning device. In this embodiment, information on which RNTI of the multiple RNTIs is assigned may be provided to a target terminal with bits less than the RNTI. For example, when the RNTI is configured with 16 bits, and 8 RNTIs can be assigned to a target terminal, information on which RNTI of these 8 RNTIs is used may be provided to the positioning device with information of 3 bits.

In one embodiment, when the positioning device receives RNTI information of the target terminal 110 required to be located, or after the positioning device has received the RNTI information, the base station 120 may provide approximate position information on the target terminal 110. An attempt to locate the target terminal may be performed in a situation where one or more positioning devices 130 are placed around the target terminal 110 based on such information. The positioning device 130 of the present disclosure may attempt to detect an uplink signal transmitted by the target terminal 110 required to be located based on an assigned RNTI. The positioning device 130 obtains resource assignment information of the target terminal by receiving resource assignment information of downlink based on the RNTI, and based on this, detects and measures an uplink signal of the target terminal.

The positioning device 130 of the present disclosure is required to acquire time synchronization in uplink in order to receive a signal of the target terminal 110 that is transmitted through uplink. To acquire time synchronization on an uplink transmission time, each positioning device 130 may include a downlink signal receiver. That is, based on time information of an associated system acquired by receiving a downlink signal, time synchronization can be obtained of allowing the target terminal 110 to transmit a signal through a reverse direction channel. When needed in this process, the downlink signal receiver included in the positioning device 130 may receive system information transmitted by the base station 120, for example, information on a broadcasting control channel (BCH) or a dynamic BCH, or the like, and thereby obtain overall parameters, or the like for the system.

At this time, in accordance with embodiments of the present disclosure, a method is provided of allowing the positioning device 130 to obtain information on when the target terminal 110 transmits a signal through uplink.

In one embodiment, the positioning device 130 may receive a control signal via one or more downlink signal receivers, and based on the received control information and identification information of a target terminal, may obtain resource assignment information for an uplink signal of the target terminal. Specifically, the positioning device 130 may receive a physical downlink control channel (PDCCH), which is a downlink control channel, using the downlink signal receiver, and obtain information on whether an uplink signal is transmitted and information on a transmitted resource. What is different from the operation of a typical LTE receiver is that the LTE downlink signal receiver according to embodiments of the present disclosure receives control information transmitted to one or more other user(s). That is, the LTE downlink signal receiver herein receives control information transmitted to another terminal (a target terminal) other than control information transmitted to the positioning device itself. The positioning device 130 can obtain information on an uplink resource assigned to the target terminal 110 based on the received target-user-related control information. Further, in this process, in order to obtain additionally information on resource assignment of uplink, the positioning device of the present disclosure may receive not only a control channel in the forward direction additionally transmitted to the target terminal 110, but information on a physical downlink shared channel (PDSCH) transmitted by being assigned to the control channel.

when the base station 120 transmits such information on an uplink transmission resource to a target terminal, in order to reduce complexity of a terminal for receiving the PDCCH or PDSCH, any limitation may be put on a type in which the base station 120 transmits signal. In this case, the positioning device 130 may receive transmission type information on a downlink signal from the base station, receive a downlink signal through one or more downlink signal receivers using the transmission type information on the downlink signal, and obtain control information by processing the received downlink signal.

For example, in the case of the PDCCH, all control-channel element (CCE) aggregations of level 1, level 2, level 4, and level 8 are available. However, according to embodiments of the present disclosure, in order to reduce the complexity of control in the positioning device 130, a base station may transmit a PDCCH to a terminal through the CCE aggregation of only level 8. In another example, the base station may transmit a PDCCH to a terminal through the CCE aggregation of level 8 or level 4. By putting a limitation on a CCE aggregation level, when one positioning device measures positions of multiple target terminals, it is possible to reduce greatly the complexity for blind decoding of the PDCCH. Further, when a base station assigns an uplink resource of a target terminal, for allowing a positioning device to measure a position of the target terminal, through a PDSCH, it is possible to reduce complexity of a positioning device by putting a limitation on a transmission mode. For example, when a base station assigns an uplink resource to a target terminal through a PDSCH for allowing an associated positioning device to measure a position of the target terminal, a transmission mode may be limited to a diversity transmission mode. As a result, since the positioning device can use only a predefined transmission mode without implementing all possible transmission modes in downlink, the complexity of the positioning device may be greatly reduced.

Through the above process, the positioning device 130 may obtain information on a time point at which the target terminal 110 transmits a signal through uplink and an associated resource. Based on this, the positioning device 130 may receive an uplink signal transmitted by the target terminal 110.

When the positioning device 130 captures a signal from the target terminal, the positioning device 130 measures a reception time and reception power of an uplink signal of the target terminal, and then transmits the measured information to the position measurement server 140. At this time, information on a signal of the target terminal provided from each positioning device 130 may include one or more of RNTI information of the target terminal (or ID information of the terminal), information on a reception time of an uplink signal, reception power information, and the like. Here, the information on the reception time of the uplink signal denotes information on a reception time relative to an absolute time determined based on GPS, or the like, and shared with all positioning devices 130. That is, it denotes a relative reception time based on a time point according to information on one common time shared between all positioning devices. In addition to the measurement information, by allowing the positioning device 130 to transmit time information obtained by measuring a signal of the target terminal 110, real-time position tracking may be enabled. A time in which an uplink signal is propagated from the target terminal to the positioning device may be calculated based on the information on the reception time. In particular, as multiple positioning devices each obtains information on a reception time or one positioning device obtains information on reception times at two or more positions, information on a propagation delay time can be obtained based on the obtained information, and a distance between the target terminal and the positioning device can be calculated based on this.

The position measurement system according to embodiments of the present disclosure may include the position measurement server 140. The position measurement server 140 receives reception time information and reception power information of an uplink signal of the target terminal 110 from the positioning device 130, calculates a position of the target terminal 110 based on the reception time information and the reception power information of the uplink signal of the target terminal 110, and transmits the position information of the target terminal 110 obtained by the calculating to the positioning device 130. Further, by transmitting, to the position measurement server, information on a time at which a signal of the target terminal is received, the positioning device may provide information on when the measurement has been performed. Based on this, the position measurement server can measure a position of the target terminal by combining respective measurements from the positioning device performed at different times.

In one embodiment, the position measurement server 140 may receive ID information of the target terminal 110, and measurement information on a reception time and reception power of an uplink signal, from one or more positioning devices. The ID information of the target terminal may be an RNTI. In another example, a number that is defined in advance between the position measurement server and the positioning device and that is assigned to one target terminal may be used as the ID of the target terminal. The position measurement server 140 can calculate a position of the target terminal based on information such as triangulation and propagation attenuation obtained based on measurement information transmitted by positioning devices, and transmit the resulted position information to the positioning devices. As a position measurement method used in these embodiments, various typical techniques that have been used in many studies may be applicable, and herein, a positioning device and an associated operating environment are provided for allowing such position measurement to be performed.

In one embodiment, a position measurement server 140 according to embodiments of the present disclosure may further receive, from a base station 120, information on a reception time and reception power of an uplink signal of a target terminal 110 which is received by the base station 120, and calculate a position of the target terminal 110 by combining information on a reception time and reception power of the uplink signal of the target terminal 110 from a positioning device 130 and the information on the reception time and the reception power of the uplink signal of the target terminal 110 from the base station 120. Through this, accuracy of position information of the target terminal 110 can be improved by using both measurement information transmitted by each positioning device 130 and measurement information performed by the base station 120. That is, the base station 120 communicating with the target terminal 110 may also measure a delay over a channel and reception power of a signal transmitted by the target terminal 110, and transmit the measured information to the position measurement server 140. Since the position measurement server 140 receives measurement information on an uplink signal of the target terminal 110 from the base station, as well as the positioning device 130, and performs a corresponding position measurement by combining the measurement information on the uplink signal of the target terminal 110 from the base station 120 and measurement information on the uplink signal of the target terminal 110 from the positioning device 130, it is possible to perform the position measurement more accurately. In this process, the positioning device and the base station that transmit corresponding measurements to the position measurement server may transmit their own position information to the position measurement server. The position measurement server calculates a position of the target terminal based on the position information and the measurements.

The position measurement server 140 transmits information on the target terminal 110 which includes the calculated position information for the target terminal 110 to the positioning device 130. When receiving the position information of the target terminal 110, the positioning device 130 provides the position information to a user by outputting to an output device including a display unit. In one embodiment, a method of providing the position of the target terminal 110 by the positioning device 130 to a user may be performed by indicating the position of the target terminal 110 on a map.

Accuracy of the position measurement according to embodiments of the present disclosure may differ depending on a position at which the positioning device 130 is placed. For more accurate position measurement, it is effective to place the positioning device 130 in a direction in which a measurement error can be reduced. To do this, in one embodiment, one or more positioning devices 130 each may transmit its own position information to a position measurement server 140, and the position measurement server 140 may receive respective position information of one or more positioning devices from one or more positioning devices, calculate respective moving directions of one or more positioning devices so that arrangements between one or more positioning devices and the target terminal can enable an error of the position measurement of the target terminal to be reduced, and transmit information on the respective moving directions of one or more positioning devices to one or more positioning devices, respectively.

That is, the position measurement server 140 of the present disclosure can measure a position of the target terminal 110 based on measurement data transmitted by one or more positioning devices 130 and transmit information on a moving direction of each positioning device 130 to the positioning device 130. For example, a position of the positioning device 130 as well as a position of the target terminal 110 may be indicated on a map, and to reduce a measurement error, a direction in which the positioning device 130 is required to be moved or information on a destination may be indicated on the map by an arrow. Further, the positioning device 130 of the present disclosure can indicate, on a map, information on a position of one or more other positioning devices 130 as well as its own position; thereby, allow positions or distances between respective users of the positioning devices 130 to be identified. In this case, the position of the target terminal 110, the position of the positioning device 130, and the position(s) of one or more other positioning devices 130 may be represented using different colors or shapes from one another.

Figure 4:
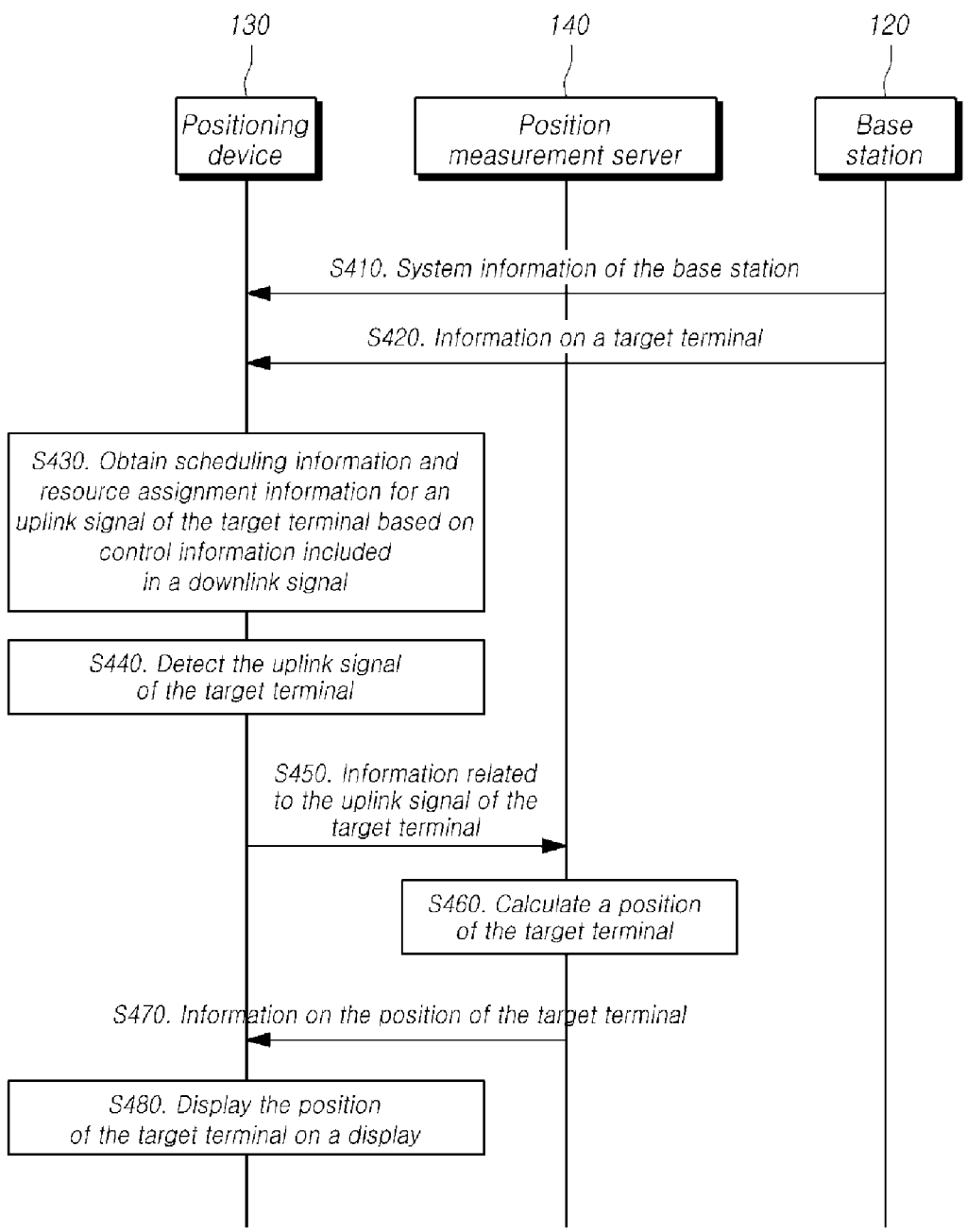
FIG. 4 is a flow diagram illustrating operations between a positioning device, a position measurement server and a base station for the embodiment of FIG. 3.

FIG. 4 is a flow diagram illustrating operations of the positioning device 130, the position measurement server 140 and the base station 120 in the embodiment of FIG. 3. Referring to FIG. 4, the positioning device 130 of the present disclosure captures a signal from the adjacent base station 120 in an initialization process and acquires time synchronization to the base station 120, and obtains system information transmitted in the downlink by the base station 120, at step S410. Further, the positioning device 130 receives identification information of the target terminal 110 including an RNTI value of the target terminal 110 required to be located, at step S420. The information of the target terminal 110 may be received through the LTE downlink or through another communication channel. The order in which the acquiring of the time synchronization to the LTE system and the obtaining of the information on the target terminal 110 are performed in the initialization process can be changed to each other. Thus, even when the order is changed, there is no influence on the operation. In the above process, the base station of an associated mobile communication network may directly transmit identification information of the target terminal to the positioning device. In another example, the identification information of the target terminal may be transmitted to a separate server, and the server may transmit it to one or more positioning devices. In this process, the position measurement server of the present disclosure may serve as the server transmitting the identification information of the target terminal to one or more positioning devices. That is, the position measurement server may perform functionality of receiving the identification information of the target terminal from the base station and transmitting it to one or more positioning devices.

After the initialization process has been performed, the positioning device 130 receives control information from the base station 120 through the LTE downlink. The control information may include scheduling information for an uplink transmission, such as resource assignment for uplink, or the like. Accordingly, the positioning device 130 obtains the scheduling information of an uplink signal of the target terminal or the resource assignment information based on the received control information, at step S430. The positioning device 130 attempts to detect an uplink signal transmitted by the target terminal 110 based on the scheduling information or the resource assignment information, at step S440. The positioning device 130 measures a time at which the detected signal reaches the positioning device 130, reception power, and the like, and transmits the measured information to the position measurement server 140, at step S450. In one embodiment, the positioning device 130 may transmit its own position information together with the measurement information for the uplink, such as the reception time, the reception power, and the like to the position measurement server 140. The position measurement server 140 calculates a position of the target terminal 110 based on the measurement information transmitted by one or more positioning devices 130, at step S460. The information on the calculated position of the target terminal 110 is transmitted to one or more positioning devices 130, at step S470, and one or more positioning devices 130 output the received information to respective output devices including a display, at step S480. In one embodiment, in a case where the position measurement server 140 of the present disclosure includes an output device such as a display, the position measurement server 140 may display the position information of the target terminal 110 on the output device of the position measurement server 140. The positioning device 130 and the position measurement server 140 repeatedly perform the process of measuring an uplink signal from the target terminal 110 and the process of locating the target terminal 110. Further, the positioning device may transmit position information of one or more other positioning devices to a corresponding positioning device, and the positioning device can display, on a display thereof, a position of the target terminal, a position of the positioning device being used by a corresponding searcher, or a position of one or more other positioning devices.

In the embodiments illustrated in FIGS. 3 and 4, the positioning device 130 obtains uplink resource assignment information by analyzing a downlink signal of the LTE. However, the reception performance of a downlink signal may differ depending on a position of the positioning device 130 in one cell. That is, one positioning device may have a high reception success rate of downlink resource assignment information, while another positioning device may have a low reception success rate of the downlink resource assignment information. In this case, received resource assignment information may be shared between positioning devices 130 using a separate communication channel.

Figure 5:
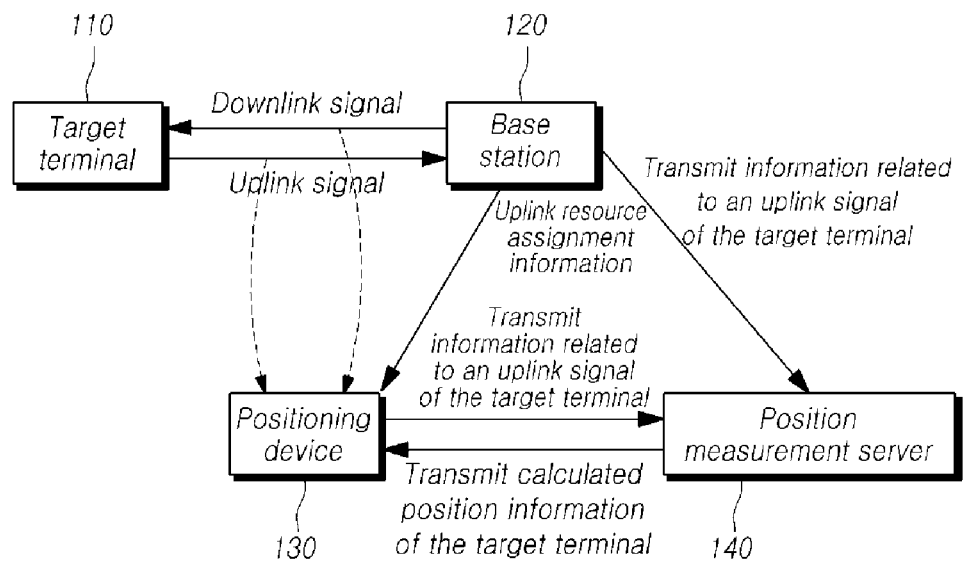
FIG. 5 illustrates communication between entities included in a position measurement system according to another embodiment of the present disclosure.

FIG. 5 illustrates communication between entities included in a position measurement system according to another embodiment of the present disclosure. Most of operations in the embodiment of FIG. 5 are substantially equal to the embodiment of FIG. 3, and the description with reference to FIG. 3 may be substantially equally or similarly applied for description with reference to FIG. 5. The main difference from the embodiment of FIG. 3 is that a base station 120 directly transmits uplink resource assignment information of a target terminal 110 to one or more positioning devices 130. That is, it is not necessary for the positioning device 130 to receive uplink resource assignment information transmitted by the base station 120 to the target terminal, and the uplink resource assignment information is directly transmitted from the base station 120 to one or more positioning devices 130. According to the scheme of FIG. 5, one or more positioning devices 130 can receive the resource assignment information more stably. The resource assignment information of the target terminal may include parameter information on a transmission type, a period, transmission power, and the like, as well as the resource assignment information, such as a time of uplink of the target terminal, a code, and the like. Further, the parameter information related to an uplink transmission of the target terminal may include RNTI information of the target terminal.

According to this embodiment, it is possible to accurately provide a transmission time to one or more positioning devices and provide a time range in which an uplink signal can be transmitted to one or more positioning devices. If information on the time range for the transmission time of the target terminal is transmitted, the positioning device herein tries to detect a corresponding uplink signal from the target terminal for the time range.

In order to measure accurately a position of the target terminal, an associated mobile communication network connects a link between the base station and the target terminal. The mobile communication network transmits information on the link to one or more positioning devices of the present disclosure. The positioning device according to embodiments of the present disclosure received such information receives an uplink signal transmitted by the target terminal and obtains information on information on a propagation strength and a time delay of the signal transmitted by the target terminal At this time, the information provided by the mobile communication system may include parameters for a channel of the link established between the target terminal and the base station.

In the scheme illustrated in FIG. 5, the positioning device 130 may include a downlink signal receiver. The downlink signal receiver may capture a downlink signal transmitted by the base station 120, and based on this, obtain a strength of a signal from the base station 120, time synchronization information, system information, and the like.

Figure 6:
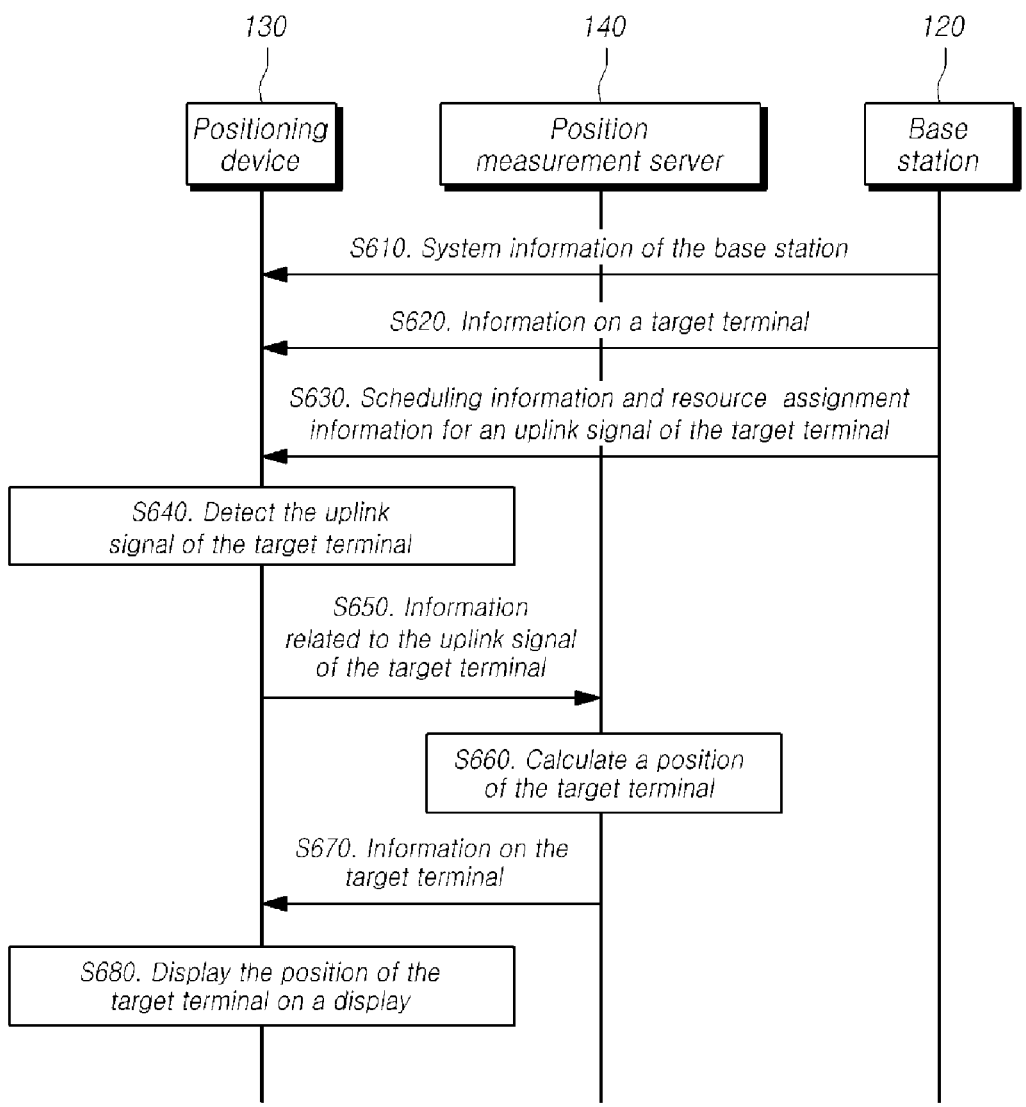
FIG. 6 is a flow diagram illustrating operations between a positioning device, a position measurement server and a base station for the embodiment of FIG. 5.

FIG. 6 is a flow diagram illustrating operations of the positioning device 130, the position measurement server 140 and the base station 120 in the embodiment of FIG. 5. Most of operation of FIG. 6 is similar to the operation of FIG. 4 and the description related to the embodiment of FIG. 4 may be applicable to description for the operation of FIG. 6. In this case, it is not necessary for a positioning device 130 in FIG. 6 to obtain information on uplink transmission resource and time of a target terminal from a signal transmitted by the base station 120 to the target terminal 110, and the base station 120 transmits the information on the uplink transmission resource and time of the target terminal to both the target terminal 110 and one or more positioning devices 130. Therefore, there is a difference in that the positioning device 130 is not required to obtain resource assignment information transmitted to the target terminal 110 by receiving a downlink signal through one or more downlink signal receivers. That is, the base station 120 may transmit information on an uplink resource and a transmission time assigned to one target terminal 110 to each of one or more positioning devices 130 measuring a position of the target terminal 110, or transmit the information to one or more positioning devices 130 through multicast transmission, at step S630. The positioning device 130 may receive the information transmitted by the base station 120, and based on this, attempt to detect an uplink signal from the target terminal 110, at step S640. In the above process, the base station of an associated mobile communication network may directly transmit resource assignment information and information on a transmission time for the target terminal, or may transmit them through another communication server. That is, the base station of the mobile communication network may transmit the resource assignment information and the information on the transmission time through the communication server, and the communication server may transmit them to one or more positioning devices. Further, the position measurement server may serve as the communication server. That is, the position measurement server may perform functionality of receiving the resource assignment information and the information on the transmission time for the target terminal from the mobile communication network, and transferring the received information to one or more positioning devices.

The positioning device according to embodiments of the present disclosure as shown in FIG. 6 captures a signal from an adjacent base station and acquires time synchronization to the base station, in an initialization process, and obtains system information transmitted through the downlink by the base station. Further, the positioning device receives uplink configuration information of a target terminal required to be located. The information of the target terminal may be received through the downlink of an associated system used by the target terminal, or received another communication channel. The order in which the acquiring of the time synchronization to the mobile communication system and the obtaining of the configuration information of the uplink channel of the target terminal are performed in the initialization process can be changed to each other. Thus, even when the order is changed, there is no influence on the operation. A separate communication device from devices used to measure the target terminal may be employed to receive the configuration information of the uplink channel of the target terminal. In this case, configuration information of a channel for the target terminal may be received from the mobile communication network using the separate communication device.

In another embodiment, the base station of the mobile communication network and the positioning device may define, in advance, a type of a channel for an uplink signal, a transmission format, a transmission time, a period, and transmission power. When it is determined that a position of a target terminal is needed to be identified, the base station may configure the target terminal to transmit an uplink signal using the predefined channel type and format. In this case, the positioning device can detect and measure an uplink signal from the target terminal based on parameters related to the predefined channel type and format etc.

In this process, the positioning device is required to obtain RNTI information used by the target terminal. In this case, such information may be transmitted from the base station of the mobile communication network to one or more positioning devices. In another embodiment, the RNTI information may be transmitted from the base station to a communication server, and then the communication server may transmit it to one or more positioning devices. The RNTI information may be included in information defined in advance between the base station of the mobile communication network and the positioning device.

In this process, even when parameters related to a channel over which the target terminal transmits a signal, a transmission scheme, a resource, power, and the like are defined in advance, the positioning device may not identify whether a predefined uplink transmission of the target terminal is actually performed. Thus, even when the target terminal transmits an uplink signal using the predefined transmission channel, the transmission scheme, the resource, the power, and the like, the base station of the mobile communication network may provide information on whether the corresponding transmission is started or ended to one or more positioning devices herein. In another example, the base station may provide information on a time at which the target terminal starts or ends the corresponding uplink transmission to one or more positioning devices. In another example, the base station of the mobile communication network may provide the transmission start or end information to a communication server, and then the communication server may transmit it to one or more positioning devices.

A difference between the embodiments of FIGS. 4 and 6 is whether information on an uplink resource and a transmission time assigned to the target terminal 110 is transmitted by the base station 120 to one or more positioning devices 130. In the embodiment of FIG. 4, the base station 120 does not transmit the above information to one or more positioning devices 130, and one or more positioning devices 130 obtain the information by attempting to receive control information transmitted by the base station 120 to the target terminal 110. In the embodiment of FIG. 6, the base station 120 transmits the uplink resource assignment information to both the target terminal 110 and one or more positioning devices 130. Thus, the positioning device 130 may stably obtain the uplink resource assignment information of the target terminal 110 without receiving control information transmitted to the target terminal 110 in the downlink.

In one embodiment, by combining the embodiments of FIGS. 4 and 6, the positioning device 130 may not only obtain resource assignment information by receiving control information transmitted in the downlink from the base station 120 to the target terminal 110, but receive resource assignment information of the target terminal 110 transmitted by the base station 120 to the positioning device 130. By combining two schemes according to the embodiments of FIGS. 4 and 6, it is possible to improve a reception rate of resource assignment information for the target terminal 110 and minimize a time delay for receiving the resource assignment information.

In another embodiment, uplink assignment information for the target terminal 110 may be classified into first resource assignment information and second resource assignment information, and each of the first resource assignment information and the second resource assignment information may be transmitted in a different method from each other. That is, when the base station 120 performs resource assignment for an uplink transmission of the target terminal 110, the base station 120 transmits resource assignment information on a specific resource to only the target terminal 110, and transmits resource assignment information for other resources to all of the target terminal 110 and one or more positioning devices 130. For example, in a first resource assignment type, the base station 120 transmits information on the first resource assignment to only the target terminal 110. In this case, to obtain the first resource assignment information, the positioning device 130 is required to attempt to receive a control channel transmitted by the base station 120 to the target terminal 110. In a second resource assignment type, the base station 120 transmits information on the second resource assignment to one or more positioning devices, as well as the target terminal 110. In this case, to obtain the second resource assignment information, the positioning device 130 is not needed to receive a control channel transmitted by the base station 120 to the target terminal 110.

In the embodiments of FIGS. 3 to 6, one or more positioning devices 130 transmit measurement information to the position measurement server 140, and the position measurement server 140 calculates a position of the target terminal 110 based on this and transmits it to one or more positioning devices 140. In another embodiment, each positioning device 130 may share, with other positioning devices, information obtained by measuring a signal of the target terminal 110 using a different communication device from one another, and thereby, individually calculate a position of the target terminal 110. In this case, the position measurement herein may be performed without the position measurement server 140.

In another embodiment, one positioning device may receive measurements obtained by measuring a signal of the target terminal 110 by other positioning devices and calculate a position of the target terminal, and thereafter, transmit information on the calculated position to other positioning devices. In this case, it can be understood that the one positioning device serves as a position measurement server.

In a situation where the mobility of the target terminal is low, one positioning device may be used to measure an uplink signal from the target terminal at multiple positions, and based on results from the measurement, measure a position of the target terminal. When measuring a position of the target terminal using one positioning device, the positioning device may transmit information on the measurement results performed at multiple positions to a position measurement server, and the position measurement server may measure the position of the target terminal based on this. In another example, without transmitting information on the measurement results to the position measurement server, the one positioning device itself may measure a position of the target terminal based on the results from the measurement. However, in this embodiment, since it takes a long time to measure at multiple positions and the accuracy of the measurement is not high when the target terminal is moving, a position of the target terminal may be measured by using several positioning devices. When a position of the target terminal is measured using one positioning device, the position of the target terminal can be measured based on measurements for a recent Tm time. Further, a position of the target terminal may be measured based on the results of recent measurements at Nm different positions.

Figure 7:
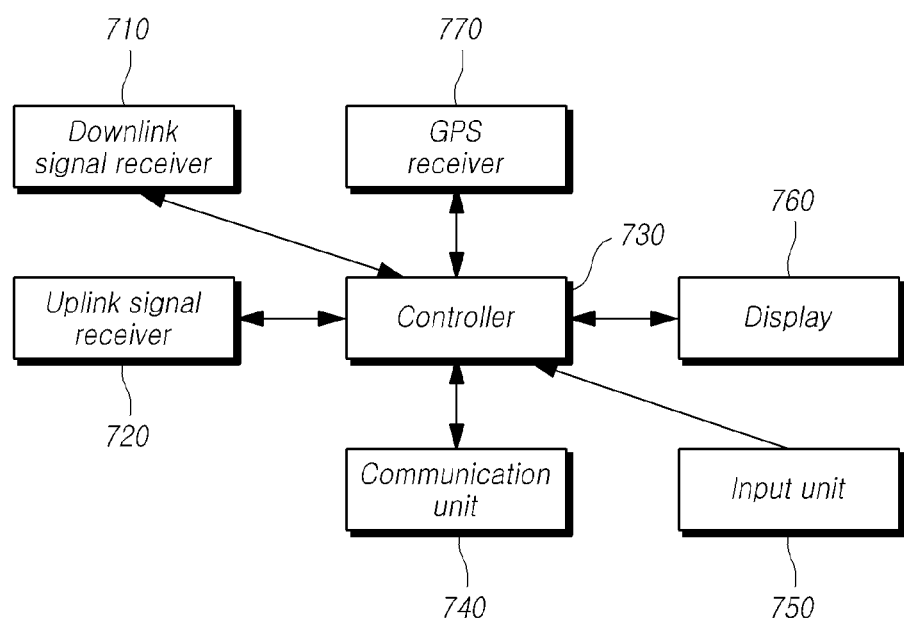
FIG. 7 illustrates a positioning device according to an embodiment of the present disclosure.

FIG. 7 illustrates a positioning device according to an embodiment of the present disclosure. Referring to FIG. 7, a positioning device according to embodiments of the present disclosure includes one or more downlink signal receivers 710 and one or more uplink signal receivers 720 to receive a signal in a mobile communication network. Further, the positioning device includes a controller 730 for controlling a received signal. Optionally, the positioning device may include a communication unit 740 for performing communication with a base station, a position measurement server, or one or more other positioning devices, a GPS receiver 770 for performing synchronization with an absolute time, an input unit 750 for receiving an input from a user, and a display 760 displaying information processed by the controller 730.

Here, the downlink signal receiver 710 and the uplink signal receivers 720 may be an LTE downlink signal receiver and an LTE uplink signal receiver, respectively. The downlink signal receiver according to embodiments of the present disclosure may configure a frequency band for transmitting control information as a frequency band on which a target terminal transmits an uplink signal. Embodiments of the present disclosure are discussed based on the LTE system; however, may be easily applied to other wireless communication systems. That is, in a case where a communication system in which a call of a target terminal is established is a GSM or W-CDMA system, the downlink signal receiver 710 and the uplink signal receiver 720 are implemented as a downlink signal receiver and an uplink signal receiver of GSM or W-CDMA system, respectively.

The LTE downlink signal receiver captures an LTE downlink signal in an initialization stage and acquires time synchronization to the system, and obtains a base station ID, system information, and the like. Further, a strength of a downlink signal obtained by measuring a signal transmitted from a base station may be displayed on a display. Further, an ID of an associated base station or whether the downlink signal receiver or the positioning device is placed within a desired service area of the base station can be displayed. Through this, a user can identify whether the downlink signal receiver or the positioning device is located within a desired service area of the base station. A BCCH, and the like may be received through the downlink signal receiver, and system information may be obtained.

Further, the downlink signal receiver 710 may receive control information transmitted by a base station to a target terminal. The LTE uplink signal receiver receives information of an uplink transmission resource assigned to a target terminal. Further, in another embodiment, resource assignment information of the target terminal may be received via the communication unit 740 from a communication server, and a position measurement server may be used as the communication server. In another embodiment, a signal of a target terminal may be configured to be transmitted over a resource and at a time that are defined in advance between a mobile communication network and a positioning device, and the resource assignment information and the time information can be used. Thereafter, the controller 730 detects a transmission signal of a target terminal based on information on an uplink transmission resource assigned to the target terminal, and calculates an arrival time of the signal, signal power, and the like.

Further, the positioning device acquires an absolute time reference, and can calculate a difference in times at which respective positioning devices receive an uplink signal of a target terminal. In the embodiment of FIG. 7, to do this, one or more positioning devices can acquire time synchronization based on a GPS signal received by the GPS receiver 770. In order to acquire time synchronization, it is possible to use other techniques, such as SBAS, Galileo, or the like used for measurement or time information, as well as the GPS, or time synchronization may be established based on a combination between at least one of these techniques and the GPS. However, embodiments of the present disclosure are not limited thereto. For example, time synchronization may be established between other types of positioning devices, or any method capable of identifying a difference in arriving times may be used. In an example, time synchronization may be maintained using synchronization established in advance between positioning devices by using a high-precision clock, or in a case where time synchronization may be established such that a relative difference can be calculated, such synchronization can be applied. Further, a position measurement can be performed based on a time difference between a time at which the LTE downlink signal receiver receives a specific signal and a time at which another user, such as another LTE downlink signal receiver or another positioning device, receives an uplink signal. Information on these reception times is transmitted to a position measurement server.

In embodiments of the present disclosure, to communicate with the position measurement server or to communicate directly with one or more other positioning devices, a separate communication unit 740 may be employed. The communication unit 740 may use a band different from a band for measuring a signal of a target terminal. This is for preventing the communication unit from interfering with an uplink signal transmitted by the target terminal.

The positioning device of FIG. 7 includes an output device such as a display for providing a position of a target terminal to a user. Further, the positioning device includes the input unit 750 for receiving an input from a user. It is possible to increase the accuracy of a position measurement by allowing the user to manually input additional information such as information on a current position of the positioning device through the input unit 750.

If the positioning device of the present disclosure is installed on an unmanned drone, it may not be necessary to transmit position information calculated by an associated position measurement server to the positioning device. Instead, the position measurement server may provide the position information to the user, or display it on another type of terminal being carried by a searcher. In another embodiment, the position measurement server may transmit the position information to another server. For example, a position of the target terminal may be provided to a person controlling the drone. In another embodiment, the position information may be transmitted to a control center or a control station monitoring a position of the target terminal, and such a control center or a control station may display the position of the target terminal on a display. In this case, in one embodiment, a function of the position measurement server for transmitting a position of the target terminal to a positioning device may be set to be turned off. In another embodiment, a function of the positioning device for displaying a position of the target terminal may be set to be turned off.

The controller 730 of FIG. 7 controls operations of the positioning device. The controller 730 is connected to associated devices, units, or components, and controls information reception, measurement, communication, input and output, and the like needed to perform embodiments of the present disclosure.

Figure 8:
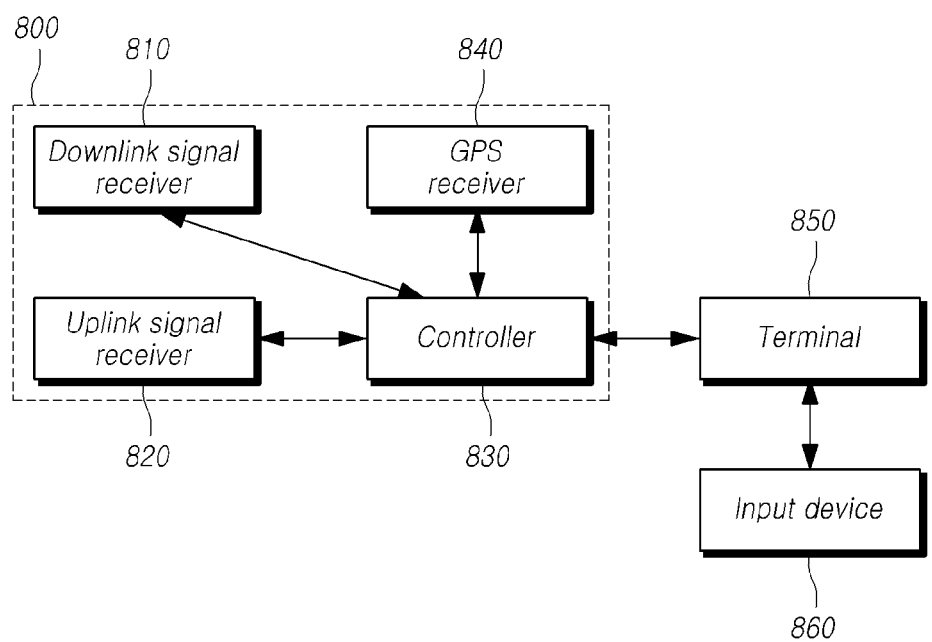
FIG. 8 illustrates a positioning device according to another embodiment of the present disclosure.

FIG. 8 illustrates a positioning device according to another embodiment of the present disclosure.

A difference of the embodiment of FIG. 7 from the embodiment of FIG. 7 is that functions such as communication with other external equipment (a positioning device or a position), displays of data or information, inputs of data or commands, and the like are performed by an externally-connected terminal 850 such as a smartphone, a tablet, or the like, resulting in the number of components included in the positioning device being reduced. The positioning device 800 in FIG. 8 includes a downlink signal receiver 810, an uplink signal receiver 820, a controller 830, and a GPS receiver 840. Some functions of the positioning device 800, such as a function for communication with other equipment, a display function, an input function, and the like are implemented by using a wired or wireless connected terminal 850 such as a smartphone, a tablet, or the like. A portion indicated by a dotted line in FIG. 8 is a new type of positioning device distinguished from the positioning devices described above. A connection between the controller 830 and the terminal 850 in FIG. 8 may be performed through a wired connection as in a USB, or be wirelessly performed though WiFi, or the like. In another embodiment, in a situation where both a wired connection and a wireless configuration are available to connect between such a positioning device and another terminal or device, such as a USB, a smartphone, a tablet, and the like, optionally, one desired connection may be selected according to a situation. Further, input and/or output units or devices, and/or interfaces for input and/or output, for a power-on/off, a function setting, and the like may be included in the positioning device as indicated by the dotted line in FIG. 8.

When it is required to accurately measure a position of a target terminal in the present disclosure, an approximate position of the target terminal may be measured by using a typical position measurement system including a mobile communication network. The information on a position of the target terminal obtained by using such a typical position measurement system may be information on a cell in which a target terminal is placed in a mobile communication network. Further, the information on a position of a target terminal obtained by using a typical position measurement system may be information that the target terminal is placed within a certain radius from a specific position obtained by additionally using WiFi, or the like.

In accordance with embodiments of the present disclosure, after identifying an approximate position of a target terminal by using one of typical position measurement systems that can be used for measuring a position of a target terminal, it is possible to identify a precise position of the target terminal based on that information. For example, an approximate position of a target terminal may be identified by identifying a position of a terminal of a missing person or a person in distress by using a typical position measurement system. Based on this, one or more positioning devices of the present disclosure may be placed around the approximate position of the target terminal.

Thereafter, in order to measure a position of the target terminal accurately, one of the positioning devices requests an associated mobile communication system to establish a link between the target terminal and an associated base station. In another embodiment, a person who wants to find the target terminal may directly request such a link establishment from a position measurement server. An associated mobile communication network establishes the link between the target terminal and the base station, and transmits associated configuration information to one or more positioning devices of the present disclosure. The configuration information may include information on a frequency used for the link established between the target terminal and the base station, a time used for multiple access or spreading code information, and a transmission format of a corresponding channel. Based on the information, one or more positioning devices of the present disclosure can detect and measure a signal transmitted by the target terminal. The information may be directly transmitted from the mobile communication network to the positioning device. In another example, the information may be transmitted to a communication server, and then the communication server may transfer it to the positioning device. In another embodiment, the position measurement server of the present disclosure may serve as the communication server.

A request for a link establishment between the base station and the target terminal may be also performed by allowing a positioning device of the present disclosure to perform the request directly to the mobile communication system. In another embodiment, such a request may be transmitted to a position measurement server, and then the position measurement server may transfer the request to an associated mobile communication network. Thereafter, the position measurement server may provide information on a link received from the mobile communication network to one or more positioning devices.

In this process, one of the positioning devices adjacent to the target terminal may become a master, and a request for setting for establishing a link, termination of the link, or the like may be transmitted by the master positioning device. Further, in another embodiment, all of the positioning devices may be allowed to have an equal authority and perform a request for setting for establishing a link, termination of the link, or the like.

Operations according to such embodiments will be described based on LTE systems. A base station of the LTE system may establish various reverse direction channels for enabling a target terminal to transmit an uplink signal, and allow one or more positioning devices to detect and measure based on the signal. In this process, one of important considerations is to enable a target terminal to transmit a wideband signal. This is because the transmission of the wideband signal enables a time delay up to reaching one or more positioning devices to be calculated more accurately, and based on this, each positioning device to calculate a propagation delay of the signal accurately. Further, the wideband signal has an advantage of enabling a target terminal to transmit a signal with large transmission power, and enabling the signal to be detected from a long distance.

The target terminal may transmit a signal by configuring a sounding reference signal (SRS), a PUSCH, or the like of the LTE system with such a wideband signal.

The SRS is a signal transmitted by a terminal with a wideband without data as a usage of a channel measurement, or the like, and a base station may configure a target terminal to transmit the SRS periodically. Further, a base station of a mobile communication network provides information on a transmission parameter of the SRS, a transmission period, a time offset, and the like to one or more positioning devices. The positioning device obtaining the SRS transmission related information detects and measures a signal of the target terminal based on the obtained transmission information of the target terminal.

In another example, a PUSCH may be configured with a wideband to transmit a signal. That is, the PUSCH is configured with a wideband, and a signal may be transmitted through the PUSCH. The base station allows the target terminal to transmit a PUSCH with a wideband, and based on this, enables one or more positioning devices to measure a signal of the target terminal. A method of configuring this can be performed such that the base station configures the target terminal to transmit a PUSCH through a PDCCH in each time at which a transmission is needed. In another configuration method, the base station may configure the target terminal to transmit a PUSCH periodically through persistent scheduling. The configuration of transmitting a PUSCH through a PDCCH in each time at which a transmission is needed may be performed such that one or more positioning devices are allowed to obtain resource assignment information of the PUSCH through examples of operations of one or more positioning devices as described above. In one example, the base station of the mobile communication network may provide one or more positioning devices with information on transmission parameters, such as a bandwidth of a PUSCH, MCS, and the like, a transmission period, a transmission time offset, and the like, which are configured through the persistent scheduling. In this process, the base station may directly transmit the information to the positioning device. Alternatively, the base station may transmit the information to a communication server, and then the communication server transfers it to the positioning device.

In another channel configuration method, the target terminal may be configured to transmit a PUCCH. Since the PUCCH is a relative narrowband signal, therefore, it is possible to configure the PUCCH to be transmitted more frequently. The mobile communication network may configure the target terminal to transmit a PUCCH periodically, and configure the positioning device to measure a signal from the target terminal based on information related to the transmission of the PUCCH. In particular, due to a channel establishment through the PUCCH transmitted relatively more frequently, this method has an advantage that the positioning device can calculate an average of reception power more accurately. In the case of configuring the target terminal to transmit a PUCCH, the base station of the mobile communication network may transmit configuration information of the PUCCH to one or more positioning devices of the present disclosure. The configuration information may include information on a using band, a PUCCH transmission format, a using code, a transmission period, a transmission time offset, and the like.

In another channel configuration method, the target terminal may transmit a signal through a PRACH, which is a random access channel, and one or more positioning devices may measure the signal. In the case of a typical PRACH, since a terminal randomly selects and transmits a code of a preamble, it is difficult for a positioning device to detect it. Accordingly, in accordance with embodiments of the present disclosure, a base station of a mobile communication network may designate a code of a PRACH to be transmitted by a target terminal, and therefore enable the target terminal to transmit a PRACH using the designated code. The positioning device detects and measures the PRACH transmitted using the designated code. The base station of a mobile communication network may provide one or more positioning devices with information related to the transmission of the PRACH by the target terminal, such as a code of the PRACH, a transmission time, a transmission band, and the like.

In the above embodiments based on the LTE, cases in which only one channel is established have been discussed. However, in order to detect and measure a position of a target terminal more accurately, it is possible to configure one or more positioning devices to detect a signal of a target terminal through an establishment of two or more different channels. For example, it is possible to configure an SRS and a PUSCH to be transmitted together or simultaneously. In another example, a PUCCH and a PUSCH may be configured to be transmitted together or simultaneously, or a PUCCH or an SRS may be configured to be transmitted together or simultaneously.

As such, when two or more channels are configured for signals transmitted by a target terminal, respective transmission periods or transmission frequencies of two or more channels are needed to be configured differently. Further, respective bandwidths of two or more channels are needed to be configured differently. For example, a channel transmitted by a target terminal relatively more frequently may be configured for a narrowband signal, and a channel transmitted by the target terminal relatively less frequently may be configured for a wideband signal. Information on these channel configurations may be provided from the base station of the mobile communication network to one or more positioning devices. Further, the positioning device can obtain the configuration information on the channels, and based on this, detect or/and measure an uplink signal from the target terminal.

Figure 9:
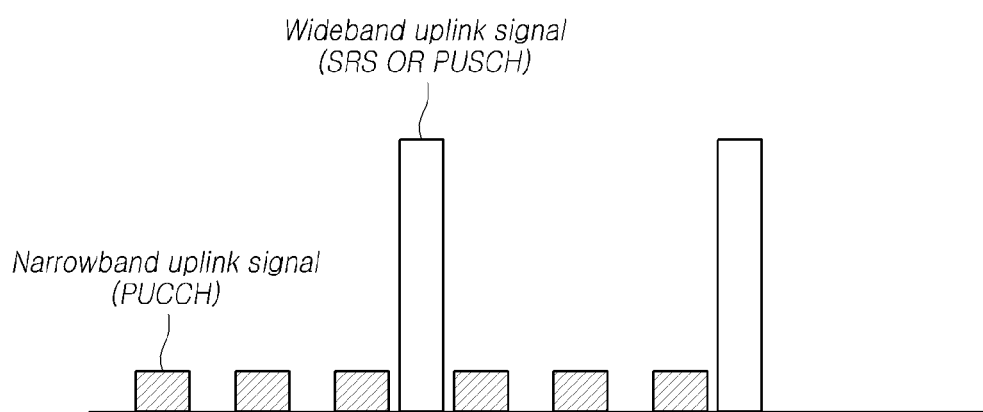
FIG. 9 illustrates a scheme in which a target terminal transmits an uplink signal according to an embodiment of the present disclosure.
Figure 10:
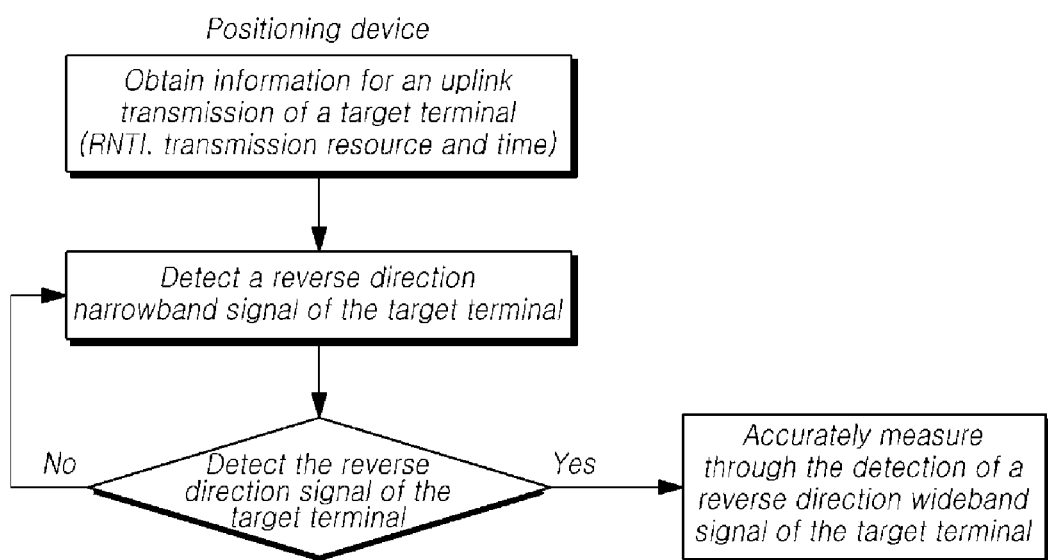
FIG. 10 illustrates a scheme in which a positioning device detects an uplink signal when a target terminal transmits the uplink signal by using two different channels according to an embodiment of the present disclosure

FIG. 9 shows an embodiment of such a transmission. Referring to FIG. 10, a target terminal is configured to transmit two different channels. That is, the target terminal can transmit a wideband signal relatively less frequently and a narrowband signal relatively more frequently. A PUCCH may be configured as the narrowband signal. Further, a PUSCH or an SRS may be used as the wideband signal. One or more positioning devices perform an operation of detecting signals from the target terminal using two different channels.

Operations of one or more positioning devices of the present disclosure based on the configuration of two different channels will be discussed for with reference to FIG. 10. The positioning device obtains an RNTI of the target terminal and information on a corresponding channel configuration. The positioning device detects and measures an uplink signal from the target terminal based on the information on the channel configuration. In the embodiment of FIG. 10, by detecting a narrowband signal first, the positioning device identifies that the target terminal is placed around the positioning device. In case the detection of the narrowband signal is successfully performed, thereafter, the positioning device more accurately measures a signal from the target terminal based on a wideband signal. In this process, when such measuring operation is performed based on both the narrowband signal and the wideband signal at the same time, the positioning device may obtain more accurate measurements.

Figure 11:
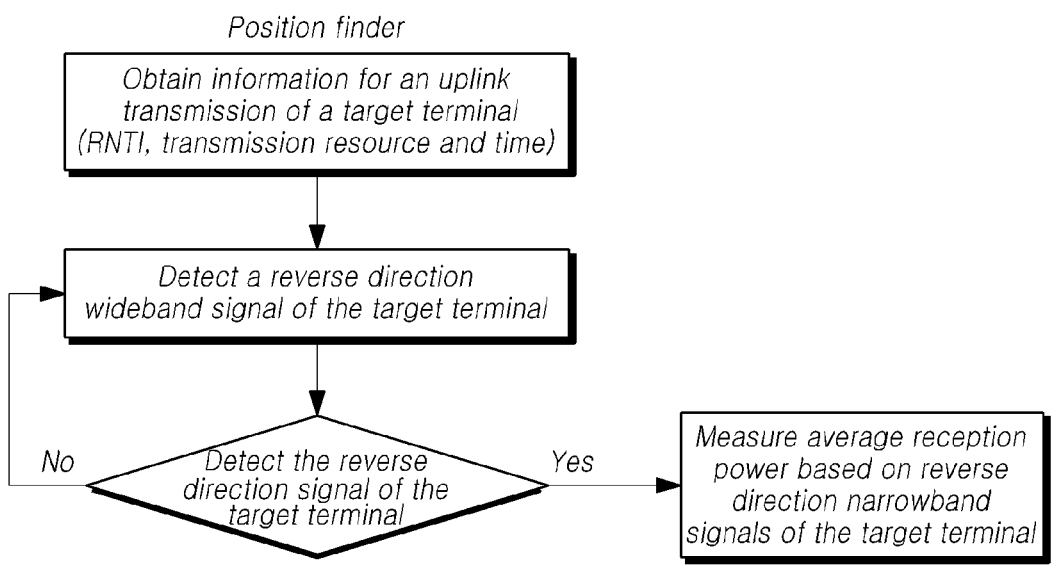
FIG. 11 illustrates a scheme in which a positioning device detects an uplink signal when a target terminal transmits the uplink signal by using two different channels according to another embodiment of the present disclosure.

Operations of one or more positioning devices according to another embodiment of the present disclosure based on the configuration of two different channels will be discussed for with reference to FIG. 11. Referring to FIG. 11, the positioning devices obtains an RNTI of a target terminal and information on a channel configuration. The positioning device detects and measures an uplink signal from the target terminal based on the information on the channel configuration. In the embodiment of FIG. 11, by detecting a wideband signal first, the positioning device identifies that the target terminal is placed around the positioning device. In case the detection of the wideband signal is successfully performed, thereafter, the positioning device more accurately measures a signal from the target terminal based on a narrowband signal. The narrowband signal that can be transmitted relatively more frequently may be used for measuring average power of signals received from the target terminal. In this process, when such measuring operation is performed based on both the narrowband signal and the wideband signal at the same time, the positioning device may obtain more accurate measurements.

If the target terminal transmits uplink signals continually, power consumption of the target terminal may be excessively increased. Further, uplink resources of an associated mobile communication system may be excessively used. To address these issues, a base station may configure the target terminal to transmit uplink signals intermittently. That is, it is possible to configure the target terminal to transmit specific uplink signals during a certain period, and configure the target terminal to stop transmitting the specific uplink signals during another period. Thereafter, it is possible to configure the target terminal to transmit the uplink signals again. By obtaining such intermittent channel configuration information, the positioning device performs operations of detecting and/or measuring uplink signals from the target terminal in a period in which the target terminal transmits signals. The intermittent channel configuration information may be received from a base station of an associated mobile communication network. In another example, the base station transmits the information to a communication server, and then the communication server may transmit it to the positioning device. In another embodiment, the position measurement server of the present disclosure may serve as the communication server.

Figure 12:
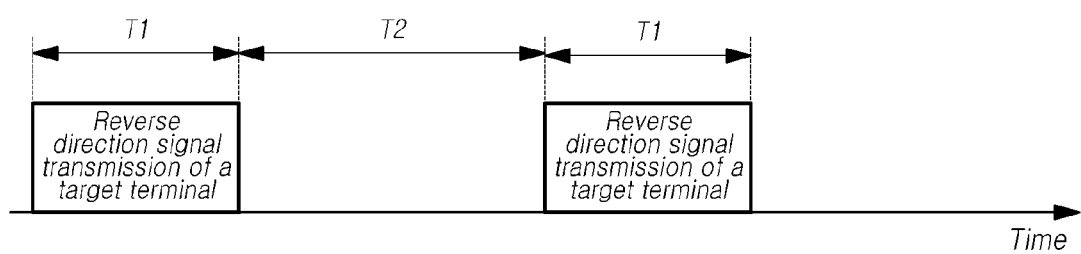
FIG. 12 illustrates a scheme in which a target terminal intermittently transmits uplink signals according to an embodiment of the present disclosure.

FIG. 12 shows an embodiment of such intermittent signal transmissions of a target terminal. Referring to FIG. 12, a base station configures the target terminal to transmit one or more specific uplink signals during a T1 time. During a T2 time subsequent to the T1 time, the target terminal is configured to stop transmitting the uplink signals. Further, when the T2 time elapses, the target terminal is configured to transmit one or more uplink signals again. The base station of an associated mobile communication network transmits such intermittent uplink transmission configuration information of the target terminal to one or more positioning devices. By receiving the intermittent channel configuration information, the positioning device performs operations of detecting and/or measuring one or more uplink signals from the target terminal in a time period in which the target terminal transmits one or more signals.

Methods of allowing the base station of the mobile communication network to transmit the information to the positioning device may be performed in various embodiments. In one embodiment, the base station may provide one or more positioning devices with information on a time offset at which the target terminal starts to transmit an uplink signal, information on a time period T1 for transmitting uplink signals and a time period T2 for stopping transmitting the uplink signals, and the like. In another embodiment, the base station may transmit a message at each time at which the target terminal starts or stops a transmission of an uplink signal to one or more positioning devices, in order to provide information on the start, stop and restart of the transmission of the uplink signal of the target terminal to one or more positioning devices. In this case, respective lengths of an uplink signal transmission time and an uplink signal stopping time of the target terminal may be adjusted. In another embodiment, once the target terminal starts to transmit an uplink signal, the base station may provide only information on the T1 time in which signals are allowed to be transmitted and information on the fact that a signal transmission is started to one or more positioning devices. In this case, when the target terminal stops transmitting signals, since a separate message is not required to be transmitted, there is an advantage that a quantity of messages is reduced.

Operations according to such embodiments will be described based on a GSM or W-CDMA system. In accordance with embodiments of the present disclosure, methods and apparatuses are provided for allowing one or more positioning devices to obtain channel configuration information on a link between a target terminal and a base station, and based on this, detect and measure an uplink signal from the target terminal. This may be performed such that a base station of an associated mobile communication network directly transmits information to one or more positioning devices, or alternatively, the mobile communication network transmits the information to a communication server and then the communication server transmits it to one or more positioning devices. In this case, the position measurement server may serve as the communication server.

In another method, the channel configuration information may be defined in advance between the base station of the associated mobile communication network and one or more positioning devices, and a channel between the target terminal and the base station may be configured using the predefined configuration. In this case, the base station of the associated mobile communication network may provide information of the extent of when an associated channel is established and how long the channel is established to one or more positioning devices. Further, the base station of the associated mobile communication network may provide information on whether a signal of the predefined configuration is transmitted, or a transmission thereof is stopped, to one or more positioning devices. Further, in the case of measuring positions of multiple target terminals, multiple channel configuration parameters may be defined in advance, and ID information for identifying these parameters may be provided to one or more positioning devices. In this process, the base station of the mobile communication network may directly transmit the information to one or more positioning devices. Alternatively, the mobile communication network transmits the information to a communication server, and then the communication server transmits it to one or more positioning devices.

One or more positioning devices of the present disclosure can measure a signal from the target terminal based on channel information of the target terminal transmitted by the mobile communication system. In this process, one or more positioning devices may attempt to receive a downlink channel transmitted to the target terminal. Based on this, it is possible to identify that a channel established between the target terminal and the base station is desirably formed. For example, it is possible to determine whether an uplink channel is transmitted based on the presence or absence of a channel transmitted to the target terminal in the downlink. Further, approximate uplink time synchronization information may be obtained based on a reception time of a downlink channel.

Operations according to embodiments of the present disclosure will be described based on a GSM communication system. The GSM system uses time division multiple access technology in which a signal is transmitted based on resources divided in time. That is, the concept of the GSM system is that one frequency channel is divided into 8 time slots for allowing 8 users each to use its own time slot. Further, an uplink signal transmitted by a terminal is consisted of data and a midamble for channel estimation. The midamble has a length of 26 bits, and uses one sequence of a total of 8 midambles.

A mobile communication network according to embodiments of the present disclosure provides one or more positioning devices with uplink channel configuration information including uplink frequency information used by a target terminal, time information of a resource used in the time division multiple access, and sequence information of the midamble. Further, the mobile communication network may provide one or more positioning devices with information on a data rate and a format of a channel transmitted in the uplink. Further, the mobile communication network may provide one or more positioning devices with information on a time at which the channel is configured, an ID for identifying the target terminal, and the like.

At the same time, configuration information of a downlink channel transmitted by the base station to the target terminal may be provided to one or more positioning devices. For example, such configuration information may include a frequency of a downlink channel, time information of a resource used in the time division multiple access, and the like. When a transmission over the downlink channel received by the positioning device is being performed, the positioning device may determine that an uplink transmission is being performed. Further, when it is determined that the transmission over the downlink channel is stopped, the positioning device may determine that an uplink transmission by the target terminal is stopped.

Operations according to embodiments of the present disclosure may be applied to a W-CDMA system, which is another circuit type communication system. In the W-CDMA system, different codes are used to distinguish among the different users. When measuring a position of a target terminal in a W-CDMA based communication system, information on a frequency used by the target terminal, uplink spreading code information, and an uplink channel structure (data rate, TFCI, the number of TPC bits, and the like) may be provided to one or more positioning devices of the present disclosure. Further, information on a time at which a link between the target terminal and the base station is established, a time length, and the like may be provided to one or more positioning devices. Further, in order for the target terminal to transmit uplink, it is necessary for the base station to transmit downlink to the target terminal. Configuration information of a downlink channel transmitted by the base station to the target terminal may be provided to one or more positioning devices. For example, the positioning device may determine whether a corresponding downlink channel is transmitted based on a power control command transmitted over the downlink channel. Further, based on the determination, the positioning device may determine whether the target terminal transmits an uplink signal.

In the present disclosure, in the GSM or W-CDMA system, methods and apparatuses are provided for providing information on a channel configuration between a base station and a target terminal to one or more positioning devices of the present disclosure, and based on this, allowing one or more positioning devices to measure an uplink signal from the target terminal. As described above, using channel configuration information defined in advance between the base station and one or more positioning devices, the base station may configure the target terminal to transmit an uplink signal. Further, the positioning device can detect and measure a signal transmitted by the target terminal based on the predefined channel configuration information.

One or more positioning devices of the present disclosure obtain information on resource assignment related to an uplink transmission of the target terminal, a transmission time, and the like, and measure an uplink signal from the target terminal based on the obtained information. In accordance with embodiments of the present disclosure, it is possible to measure accurately a position of a target terminal based on information on a reception time, reception power, and the like for an uplink signal transmission of the target terminal using one or more positioning devices.

Figure 13:
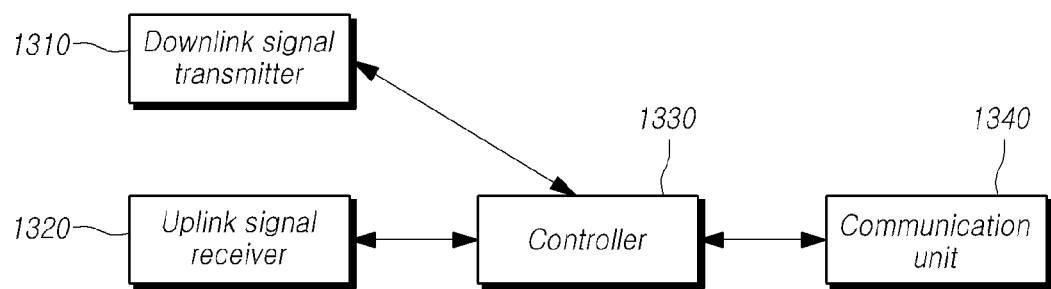
FIG. 13 illustrates a base station according to an embodiment of the present disclosure.

FIG. 13 illustrates a structure of a base station of a mobile communication network according to embodiments of the present disclosure. Referring to FIG. 13, the base station includes a downlink signal transmitter 1310 and an uplink signal receiver 1320. The downlink signal transmitter 1310 performs a function of transmitting a signal to terminals. Further, the uplink signal receiver 1320 performs a function of receiving an uplink signal transmitted by the terminals. Further, the base station of the mobile communication network includes a communication unit 1340 for transmitting an RNTI information of a target terminal or channel configuration information to one or more positioning devices. The communication unit 1340 may directly transmit the RNTI information of the target terminal or the channel configuration information to the positioning device.

In another method, the RNTI information of the target terminal or the channel configuration information may be transmitted to another communication server, and then the communication server may transfer the RNTI information of the target terminal or the channel configuration information to the positioning device. At this time, the positioning server may serve as the communication server. Further, instead of separately employing the communication unit 1340 transmitting the RNTI information of the target terminal or the channel configuration information, the base station may be configured to communicate using the downlink signal transmitter 1310 and the uplink signal receiver 1320. Further, the controller 1330 may configure the target terminal to transmit a signal using the downlink signal transmitter 1310 and the uplink signal receiver 1320 of the base station. Further, the controller 1330 performs a function of checking whether the configured signal is properly received by the uplink signal receiver 1320. Further, the controller 1330 may cause the RNTI information of the target terminal to be transmitted to the positioning device using the communication unit 1340. Further, the controller 1330 may cause the uplink channel configuration information as well as the RNTI information of the target terminal to be transmitted to the positioning device using the communication unit 1340.

Figure 14:
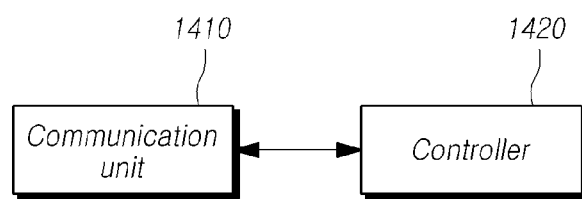
FIG. 14 illustrates a position measurement server according to an embodiment of the present disclosure.

FIG. 14 illustrates an embodiment of a configuration of a position measurement server according to embodiments of the present disclosure. The position measurement server includes a communication unit 1410. The communication unit 1410 has a function of communicating with an associated mobile communication network and one or more positioning devices. The function of communicating with the mobile communication network receives RNTI information of a target terminal or uplink channel configuration information. Further, when a position measurement request of a specific target terminal is transmitted to the position measurement server, a link establishing request for the target terminal is transferred to the mobile communication network by the function of communicating with the mobile communication network. The position measurement request may be performed by the positioning device or performed through an input unit connected to the position measurement server. When the positioning device requests a position measurement, it is transferred via the communication unit 1410. At this time, a phone number of the target terminal, an IMSI, or the like may be used as identification information of the target terminal. Further, a serial number of a terminal, a TMSI, or the like may be used. The function of communicating with the positioning device performs communication with the positioning device. The positioning device transmits measurements obtained by measuring a signal from the target terminal, and based on this, the position measurement server calculates a position of the target terminal and transmits this to the positioning device. The measurements obtained by the measuring include a strength of a signal from the target terminal, a time delay, a reception direction, and the like. Further, the measurements may include a position of the positioning device, a time at which a signal has been measured, and the like.

The positioning device includes a controller 1420. The controller 1420 performs a request for establishing a link for the target terminal to an associated mobile communication network, and performs a function of receiving a RNTI of the target terminal, resource assignment information, or the like from a base station of the mobile communication network. Further, the controller performs a function of transferring the RNTI of the target terminal or the resource assignment information to one or more positioning device. Further, the controller performs a function of receiving measurements obtained by measuring the uplink of the target terminal from one or more positioning devices, and calculating a position of the target terminal and transmitting it to one or more positioning devices. Further, the controller performs a function of receiving a position measurement request for the target terminal from the positioning device, or one or more other devices, and transferring it to the mobile communication network.

The terms "system", "processor", "controller", "component", "module", "interface", "model", "unit", and the like, may generally refer to computer-related entity hardware, a combination of hardware and software, software, or software in execution. For example, such elements described above may be, but not limited to, a process driven by the processor, a control processor, an entity, a running thread, a program and/or a computer. For example, when an application runs on a controller or a processor, all of the application, the controller or the processor can become one element. One or more components can be included within a process and/or thread of execution, and a component can be placed on one system or be disposed on more than one system.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

What is claimed is:

1. A positioning device comprising:
a downlink signal receiver configured to receive a downlink signal transmitted by a base station;
an uplink signal receiver configured to receive an uplink signal transmitted by a target terminal; and
a controller configured to control the downlink signal receiver and the uplink signal receiver,
wherein the controller obtains time information of the base station based on the downlink signal received through the downlink signal receiver, controls a reception time of the uplink signal receiver based on the time information, and measures the received uplink signal to obtain location-related measurement information for the target terminal, and
wherein the uplink signal receiver receives an uplink signal from at least two different positions with respect to the target terminal.

2. The positioning device according to claim 1, wherein the downlink signal received by the downlink signal receiver is transmitted by a serving base station to which the target terminal accesses.

3. The positioning device according to claim 1, wherein the positioning device is connected to a mobile terminal, and wherein the controller communicates with at least one external device through a communication device of the mobile terminal.

4. The positioning device according to claim 1, wherein the controller displays at least one of a position of the target terminal or a position of the positioning device on a display of the positioning device or a display of an external device communicating with the positioning device.

5. The positioning device according to claim 1, wherein the positioning device further comprises a communication device communicating with at least one external device,
   wherein the controller communicates with an external server or another terminal through the communication device.

6. The positioning device according to claim 1, wherein the time information of the base station is time information of a system managed by the base station.

7. The positioning device according to claim 1, wherein the controller transmits the obtained measurement information to a position measurement server.

8. The positioning device according to claim 1, wherein the controller receives the uplink signal transmitted from the target terminal based on channel configuration information, the channel configuration information is predefined between the base station and the positioning device.

9. The positioning device according to claim 1, wherein the channel configuration information includes information about at least one of a type, a frequency, a time, a period, and a code of a channel transmitted by the target terminal through uplink.

10. A position measurement server comprising:
   a communication device configured to communicate with a positioning device; and
   a controller configured to receive a measurement result for a signal of the target terminal from the positioning device of claim 1 through the communication device, and calculate the position of the target terminal based on the measurement result,
   wherein the measurement result is measured at least two different positions with respect to the target terminal.

11. The position measurement server according to claim 10, wherein the communication device communicates with a mobile communication network, and
   wherein the controller receives a link establishment request for the target terminal from the positioning device through the communication device, and transmits the link establishment request for the target terminal to the mobile communication network.

12. The position measurement server according to claim 10, wherein the communication device communicates with a mobile communication network,
   wherein the position measurement server further comprises an input device configured to receive an input from a user, and
   wherein the controller receives a link establishment request for the target terminal through the input device, and transmits the link establishment request for the target terminal to the mobile communication network.

13. A method for positioning a target terminal comprising:
   receiving a downlink signal transmitted by a base station;
   obtaining time information of the base station based on the received downlink signal;
   receiving an uplink signal transmitted by a target terminal through an uplink signal receiver;
   controlling a reception time of the uplink signal receiver based on the time information;
   and
   measuring the received uplink signal to obtain location-related measurement information for the target terminal,
   wherein the uplink signal is received at least two different positions with respect to the target terminal.

14. The method according to claim 13, wherein the received downlink signal is transmitted by a serving base station to which the target terminal accesses.

15. The method according to claim 13, wherein the time information of the base station is time information of a system managed by the base station.

16. The method according to claim 13, wherein the method further comprises transmitting the obtained measurement information to a position measurement server.

17. The method according to claim 13, wherein the uplink signal is transmitted from the target terminal based on channel configuration information, the channel configuration information is predefined between the base station and the positioning device.

* * * * *